United States Patent
Tung et al.

(10) Patent No.: US 12,493,733 B2
(45) Date of Patent: Dec. 9, 2025

(54) INTERCONNECT STRUCTURE DESIGN

(71) Applicant: Taiwan Semiconductor Manufacturing Company, Ltd., Hsin-Chu (TW)

(72) Inventors: Yu-Lung Tung, Kaohsiung (TW); Xiaodong Wang, Hsinchu (TW); Jhon Jhy Liaw, Hsinchu County (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 652 days.

(21) Appl. No.: 17/815,889

(22) Filed: Jul. 28, 2022

(65) Prior Publication Data

US 2023/0281372 A1  Sep. 7, 2023

Related U.S. Application Data

(60) Provisional application No. 63/316,107, filed on Mar. 3, 2022.

(51) Int. Cl.
*G06F 30/392* (2020.01)
*G06F 30/398* (2020.01)

(52) U.S. Cl.
CPC .......... *G06F 30/392* (2020.01); *G06F 30/398* (2020.01)

(58) Field of Classification Search
CPC .. G06F 30/392; G06F 30/398; G06F 2119/06; G06F 30/39; G06F 30/394; H01L 21/67005; H01L 21/768; H10D 84/01; H10D 89/10

USPC .......................................................... 716/119
See application file for complete search history.

(56) References Cited

U.S. PATENT DOCUMENTS

| | | | |
|---|---|---|---|
| 2013/0042216 A1* | 2/2013 | Loh | G06F 30/392 |
| | | | 716/119 |
| 2018/0096092 A1 | 4/2018 | Kim et al. | |
| 2020/0050728 A1 | 2/2020 | Kim et al. | |
| 2020/0402899 A1 | 12/2020 | Guo et al. | |

FOREIGN PATENT DOCUMENTS

CN  110838484 A  2/2020

\* cited by examiner

*Primary Examiner* — Paul Dinh
(74) *Attorney, Agent, or Firm* — HAYNES AND BOONE, LLP

(57) ABSTRACT

An exemplary method includes receiving a device layout for a standard cell that includes a transistor and a multilayer interconnect. The multilayer interconnect includes a power line, signal lines, a source contact connected to the power line and a source of the transistor, and a drain contact connected to one of the signal lines and a drain of the transistor. The method includes modifying the device layout for the standard cell. For example, if performance of the standard cell is sensitive to power-related features, the method includes enlarging the power line and the source contact and shrinking the signal lines and the drain contact. If performance of the standard cell is sensitive to signal-related features, the method includes shrinking the power line and the source contact and enlarging the signal lines and the drain contact. A cell height of the standard cell is the same after modifying the device layout.

20 Claims, 15 Drawing Sheets

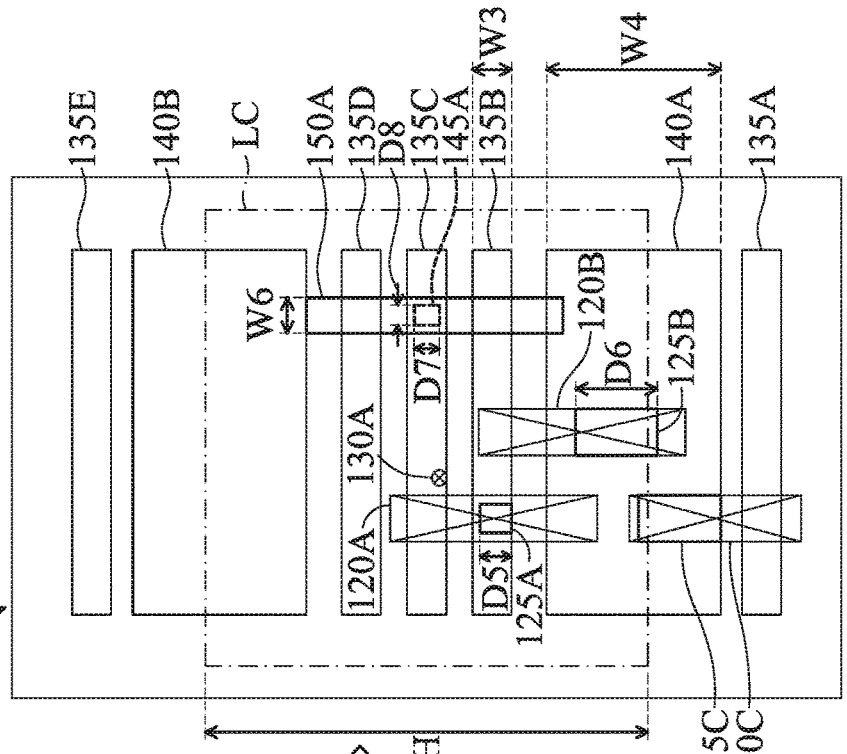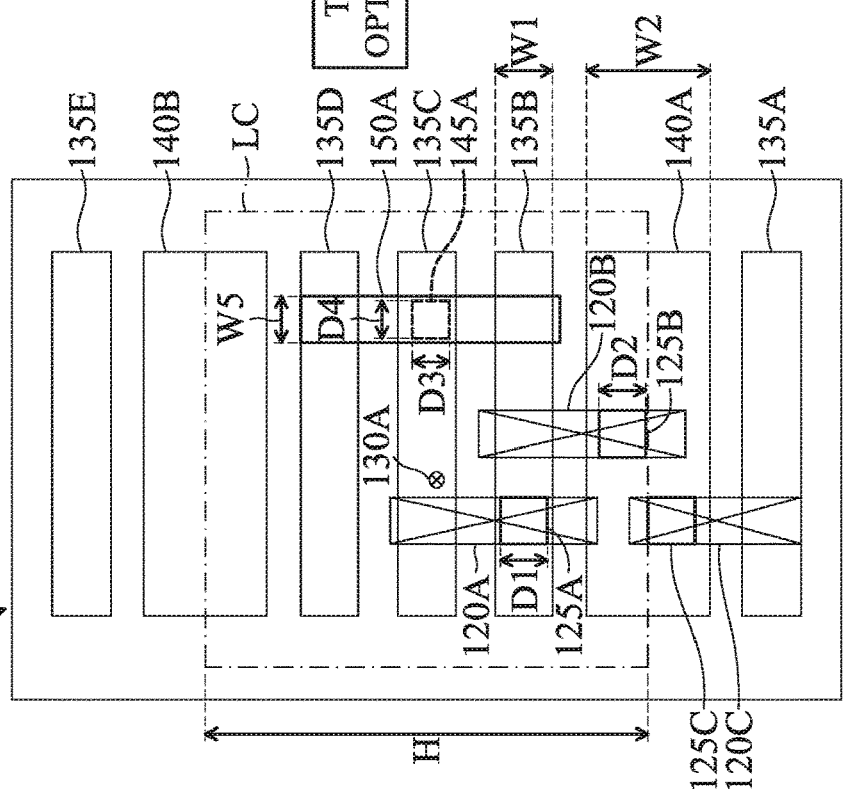
FIG. 7

INTERCONNECT STRUCTURE DESIGN

This is a non-provisional application of and claims benefit of U.S. Provisional Patent Application Ser. No. 63/316,107, filed Mar. 3, 2022, the entire disclosure of which is incorporated herein by reference.

BACKGROUND

The integrated circuit (IC) industry has experienced exponential growth. Technological advances in IC materials and design have produced generations of ICs, where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. However, such scaling down has also increased the complexity of processing and manufacturing ICs and, for these advances to be realized, similar developments in IC processing and manufacturing are needed. For example, as multilayer interconnect (MLI) features become more compact with ever-shrinking IC feature size, interconnects of the MLI features are exhibiting increased resistance and exhibiting increased capacitance, which presents performance, yield, and cost challenges. Performance of logic-based ICs is especially susceptible to such resistance and/or capacitance increase. Improvements to MLI features of logic-based ICs are thus needed.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIG. 7 illustrates power performance optimization on the layout of the standard cell of FIG. 3A and FIG. 3B according to various aspects of the present disclosure.

DETAILED DESCRIPTION

Figure 1:
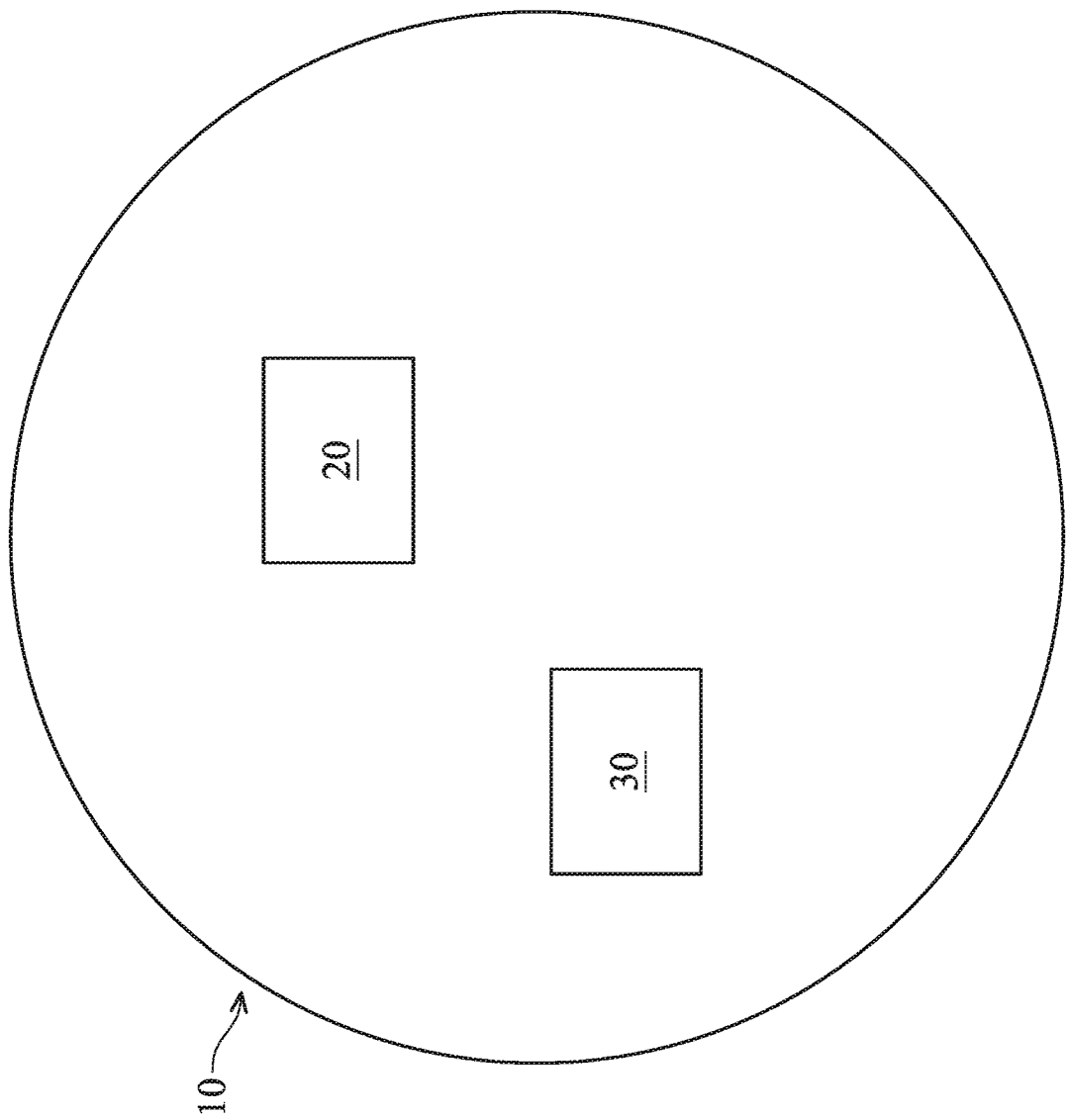
FIG. 1 is a fragmentary diagrammatic plan view of an integrated circuit (IC) chip, in portion or entirety, according to various aspects of the present disclosure.

The present disclosure relates generally to integrated circuit (IC) devices, and more particularly, to interconnect-driven optimization of IC design layouts.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "over," "below," "beneath," "up," "down," "top," "bottom," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

Integrated circuit (IC) design defines various standard cells having predetermined functions. Each standard cell includes transistors and interconnect (or routing) structures that combine to provide a logic function (for example, AND, NAND, OR, NOR, NOT, XOR, and/or XNOR) and/or a storage function (for example, flip flop, latch, and/or buffer).

Generating an IC design layout typically includes placing (or arranging) an array of standard cells in a given area to achieve a specific function and routing to connect the standard cells with each other. An IC device can then be fabricated using the IC design layout.

As IC technologies progress towards smaller technology nodes, challenges arise in configuring the transistors and interconnect structures relative to one another and/or configuring the various layers of the interconnect structures in a manner that optimizes PPAC parameters (i.e., performance (e.g., speed), power (e.g., power consumption), area, and cost), efficiency, fabrication time, fabrication costs, or combinations thereof. The present disclosure addresses such challenges by providing interconnect-driven optimization of IC design layouts, such as standard cell layouts. For example, dimensions of interconnect structures, features, and/or layers are adjusted relative to one another based on desired performance of an IC of the IC design layout, such as power performance optimization or signal performance optimization. In some embodiments, performance optimization of the IC is provided by modifying the IC design layout without changing a footprint of the IC design layout (e.g., cell dimensions and/or cell area). Details of the proposed interconnect structures and methods of design and/or fabrication thereof are described below. Different embodiments may have different advantages, and no particular advantage is required of any embodiment.

FIG. 1 is a fragmentary diagrammatic plan view of an integrated circuit (IC) chip 10, in portion or entirety, according to various aspects of the present disclosure. IC chip 10 can include passive microelectronic devices and active microelectronic devices, such as resistors, capacitors, inductors, diodes, p-type FETs (PFETs), n-type FETs (NFETs), metal-oxide-semiconductor FETs (MOSFETs), complementary MOS (CMOS) transistors, bipolar junction transistors (BJTs), laterally diffused MOS (LDMOS) transistors, high voltage transistors, high frequency transistors, other devices, or combinations thereof. The transistors may be planar transistors or non-planar transistors, such as fin-like FETs (FinFETs) or gate-all-around (GAA) transistors. The microelectronic devices can be configured to provide IC chip 10 with functionally distinct regions, such as a core region (also referred to as a logic region), a memory region (e.g., a static random-access memory (SRAM) region or a dynamic random-access memory (DRAM)), an analog region, a peripheral region (also referred to as an input/output (I/O) region), a dummy region, other suitable region, or combinations thereof. FIG. 1 has been simplified for the sake of clarity to better understand the inventive concepts of the present disclosure. Additional features can be added in IC chip 10, and some of the features described herein can be replaced, modified, or eliminated in other embodiments of IC chip 10.

In FIG. 1, IC chip 10 includes a first region 20 configured to provide a first circuit and a second region 30 configured to provide a second circuit. The first circuit and the second circuit can perform the same/similar functions and/or operations or different functions and/or operations. In some embodiments, the first circuit and the second circuit are both logic circuits. In such embodiments, first region 20 and second region 30 include logic cells, which may be standard cells. Each logic cell can include transistors and interconnect structures (also referred to as routing structures) that combine to provide a respective logic device and/or a respective logic function, such as an inverter, an AND gate, an NAND gate, an OR gate, an NOR gate, a NOT gate, an XOR gate, an XNOR gate, other suitable logic device and/or function, or combinations thereof. In some embodiments, the first circuit and/or the second circuit are memory circuits. In such embodiments, first region 20, second region 30, or both include an array of memory cells. Each memory cell can include transistors and interconnect structures that combine to provide a storage device and/or a storage function, such as a flip flop, a latch, other suitable memory device and/or function, or combinations thereof. In some embodiments, the memory cells are SRAM cells, DRAM cells, non-volatile random-access memory (NVRAM) cells, flash memory cells, other suitable memory cells, or combinations thereof.

Figure 2:
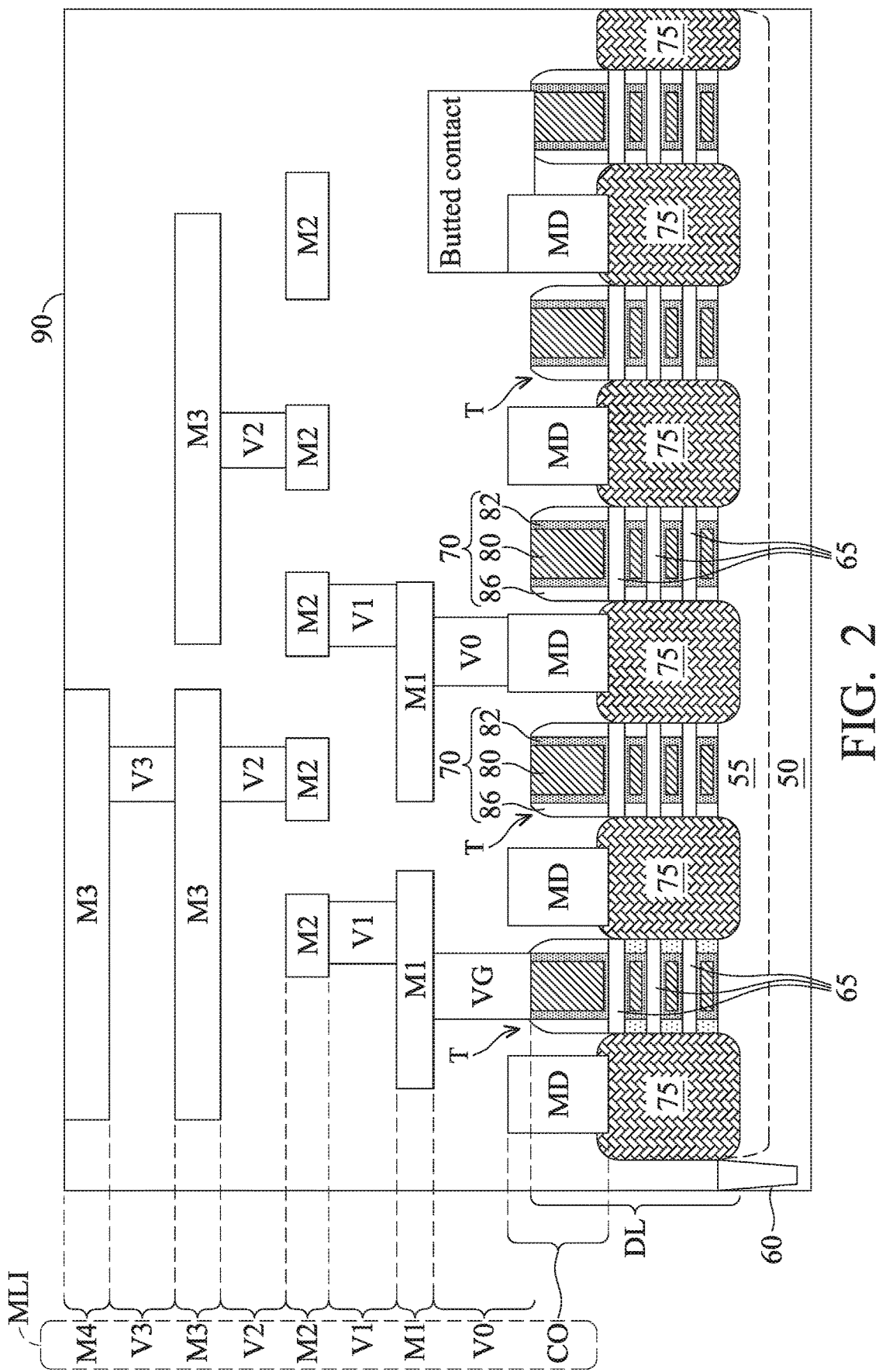
FIG. 2 is a fragmentary diagrammatic cross-sectional view of various layers (levels) that can be fabricated over a semiconductor substrate (wafer) to form a region, in portion or entirety, of an IC chip according to various aspects of the present disclosure.

FIG. 2 is a fragmentary diagrammatic cross-sectional view of various layers (levels) that can be fabricated over a semiconductor substrate (wafer) 50 to form region 20 and/or region 30, in portion or entirety, of IC chip 10 of FIG. 1 according to various aspects of the present disclosure. In some embodiments the various layers form a standard cell, in portion or entirety, which may be a logic cell or a memory cell (e.g., an SRAM cell). FIG. 2 has been simplified for the sake of clarity to better understand the inventive concepts of the present disclosure. Additional features can be added in the various layers, and some of the features described can be replaced, modified, or eliminated in other embodiments.

In FIG. 2, the various layers include a device layer DL and a multilayer interconnect MLI disposed over the device layer DL. Device layer DL includes devices (e.g., transistors, resistors, capacitors, inductors, other devices, or combinations thereof) and/or device components (e.g., doped wells, gates, source/drains, other device components, or combinations thereof). For example, device layer DL can include substrate 50, doped region 55 disposed in substrate 50 (e.g., n-wells and/or p-wells), isolation features 60, and transistors T. In the depicted embodiment, transistors T include suspended channel layers 65, gate structures 70, and source/drains 75. Suspended channel layers 65 and gate structure 70 are disposed between respective source/drains 75, and gate structures 70 wrap and/or surround respective suspended channel layers 65. Each gate structure 70 has a gate stack having a gate electrode 80 and a gate dielectric 82 and gate spacers 86 disposed along sidewalls of the gate stack.

Multilayer interconnect MLI electrically couples/connects devices and/or components of device layer DL, such that the devices and/or components can operate as specified by design requirements. For example, multilayer interconnect MLI includes a contact layer (CO level or metal zero (M0) level), a via zero layer (V0 level), a metal one layer (M1 level), a via one layer (V1 level), a metal two layer (M2 level), a via two layer (V2 level), a metal three layer (M3 level), a via three layer (V3 level), and a metal four layer (M4 level). The present disclosure contemplates multilayer interconnect MLI having more or less layers and/or levels. For example, multilayer interconnect MLI can include up to an MX level and a V(X−1) level, where X is a total number of metal layers (levels) of multilayer interconnect MLI.

Each level of multilayer interconnect MLI includes conductive features (e.g., metal lines, metal vias, metal contacts, or combinations thereof) disposed in one or more dielectric layers (e.g., an interlayer dielectric (ILD) layer and a contact etch stop layer (CESL)). In some embodiments, conductive features at a same level of multilayer interconnect MLI, such as M1 level, are formed simultaneously. In some embodiments, conductive features at a same level of multilayer interconnect MLI have top surfaces that are substantially planar with one another and/or bottom surfaces that are substantially planar with one another.

CO level includes source/drain contacts MD disposed in a dielectric layer 90, where source/drain contacts MD are disposed on source/drains 75. V0 level includes gate vias VG, source/drain vias V0, and butted contacts disposed in dielectric layer 90, where gate vias VG are disposed on gate stacks of gate structures 70, source/drain vias V0 are disposed on source/drain contacts MD, and butted contacts are disposed on source/drain contacts MD and gate structures 70. M1 level includes M1 metal lines disposed in dielectric layer 90, where gate vias VG connect gate stacks of structures 70 (e.g., gate electrodes 80) to M1 metal lines, source/drain vias V0 connect source/drain contacts MD to M1 metal lines, and butted contacts connect gate stacks of gate structures 70 and source/drains 75 together and further to M1 metal lines. V1 level includes V1 vias disposed in dielectric layer 90, where V1 vias connect M1 metal lines to M2 metal lines. M2 level includes M2 metal lines disposed in dielectric layer 90. V2 level includes V2 vias disposed in dielectric layer 90, where V2 vias connect M2 lines to M3 lines; M3 level includes M3 metal lines disposed in dielectric layer 90. V3 level includes V3 vias disposed in dielectric layer 90, where V3 vias connect M3 lines to M4 lines, and so on.

Figure 3A:
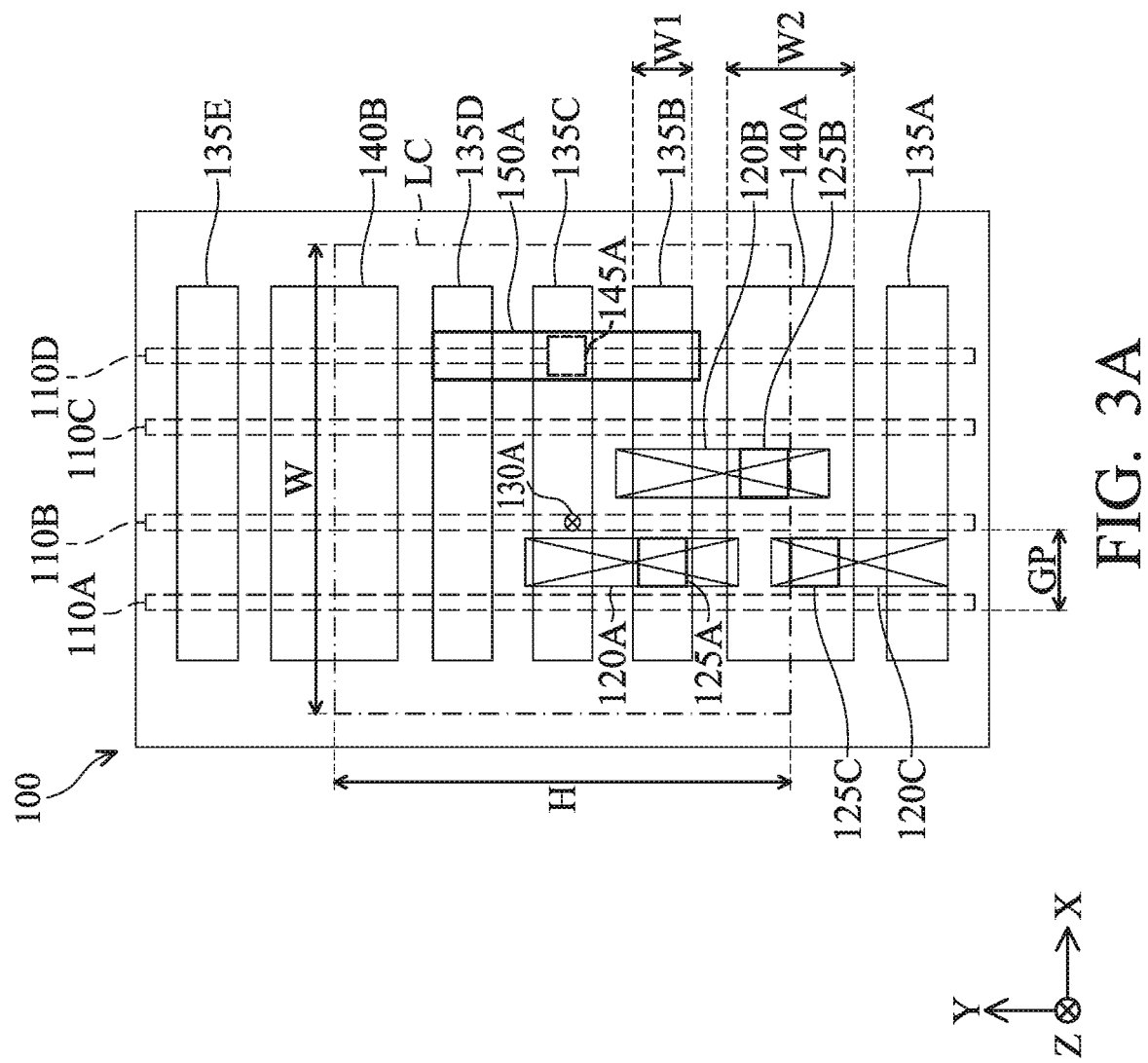
FIG. 3A and FIG. 3B are fragmentary diagrammatic views of a layout of a standard cell, in portion or entirety, according to various aspects of the present disclosure.
Figure 3B:
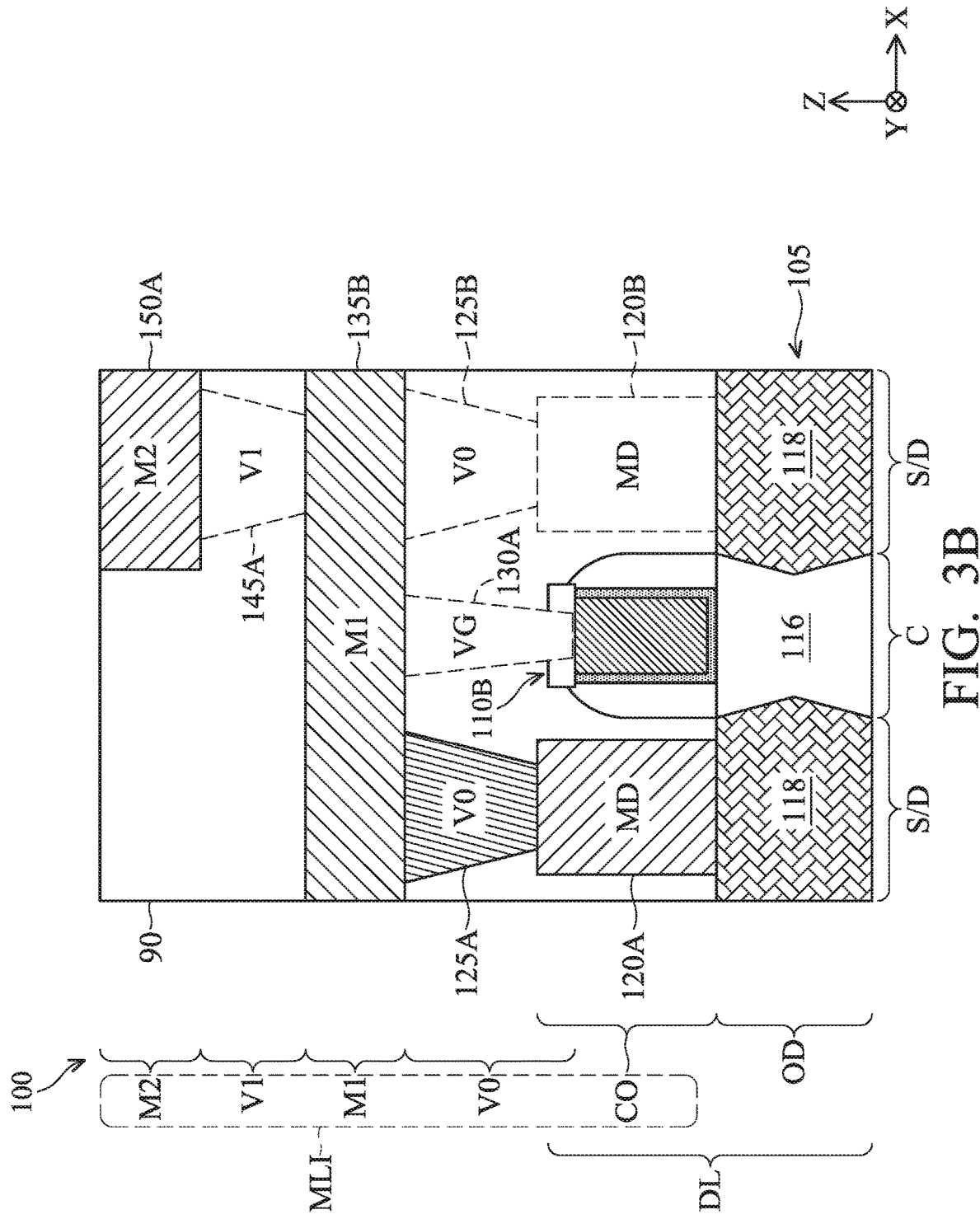
Figure 4A:
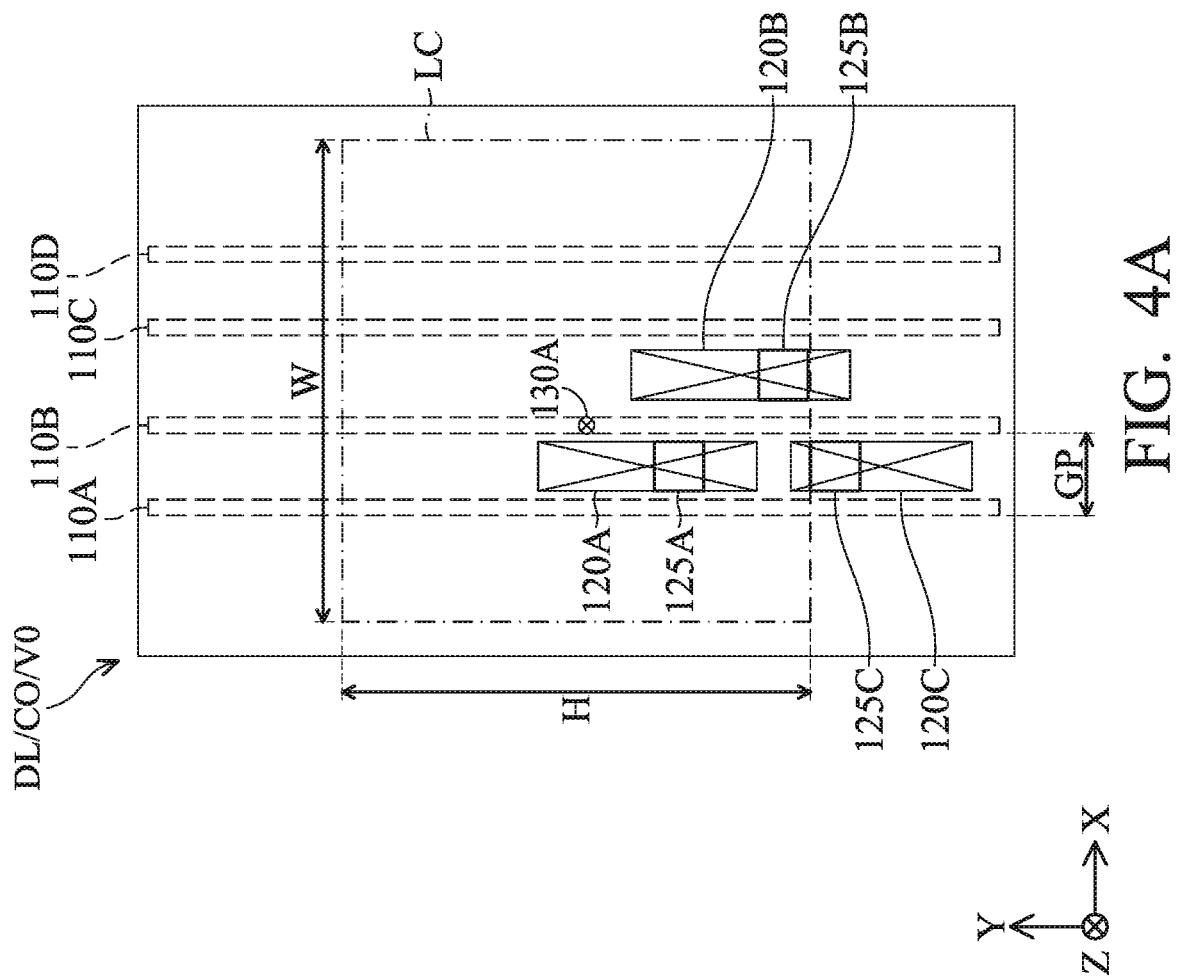
FIGS. 4A-4C are top, plan views of portions of the layout of the standard cell of FIG. 3A and FIG. 3B according to various aspects of the present disclosure.
Figure 4B:
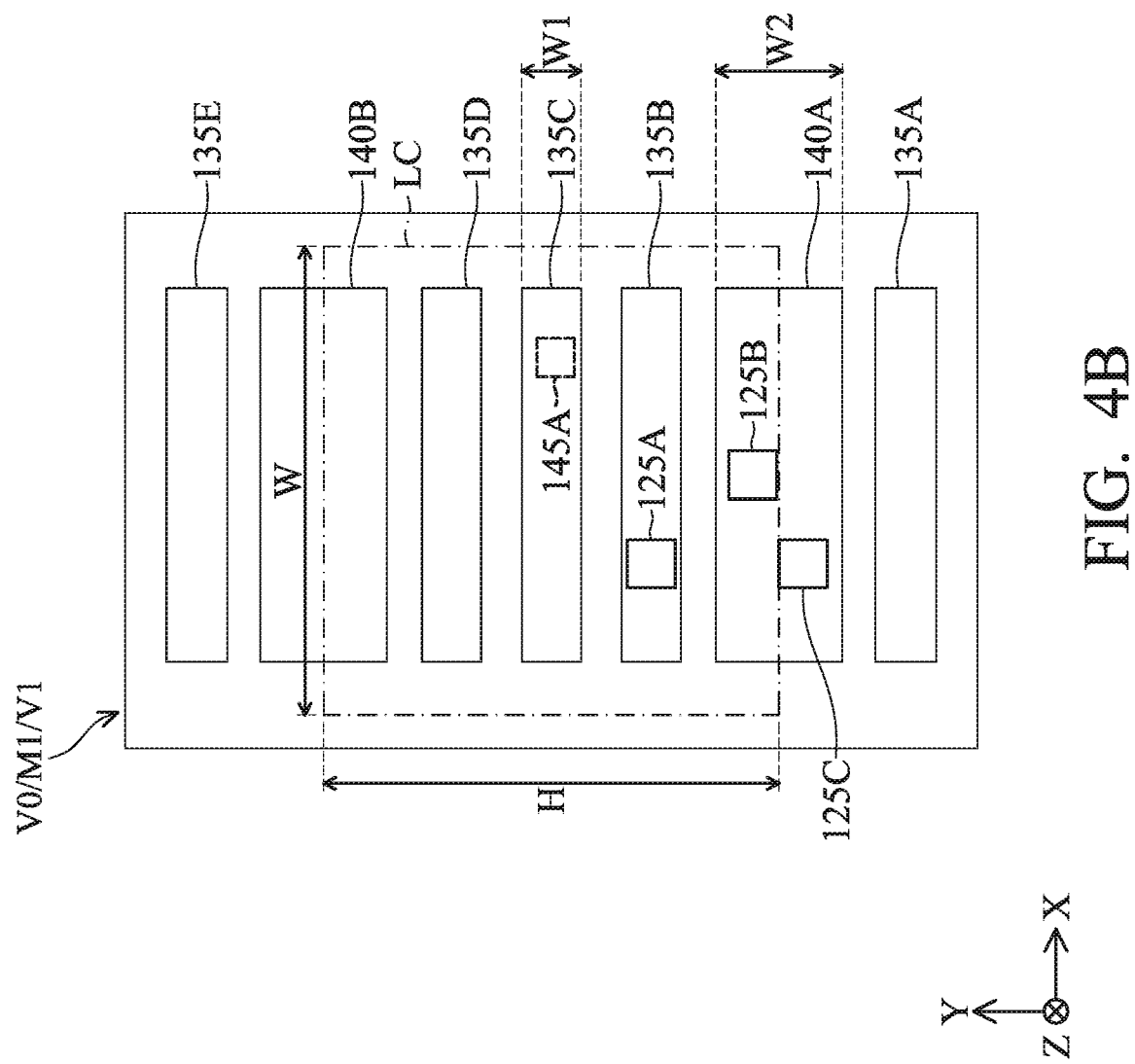
Figure 4C:
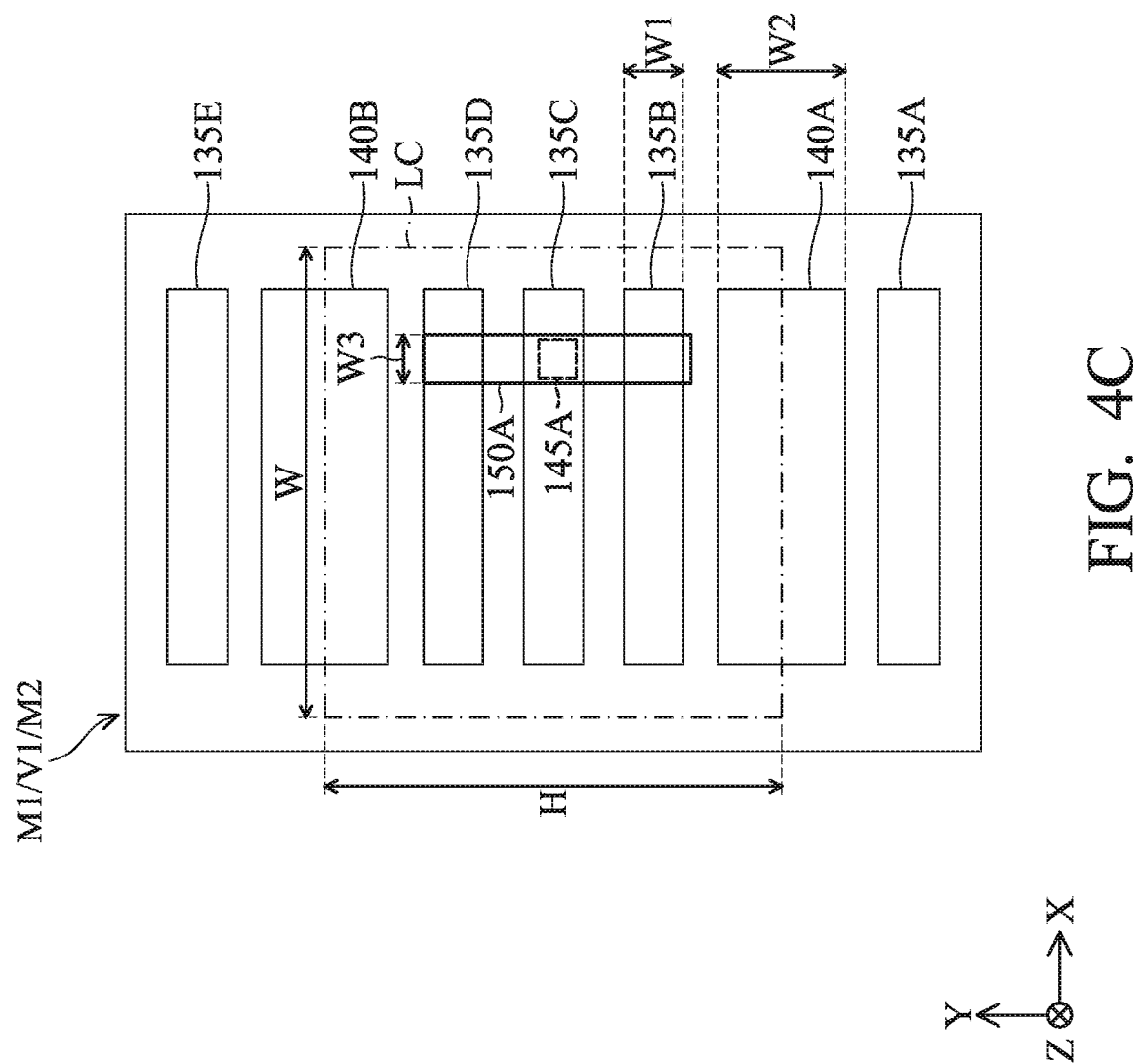

FIG. 3A and FIG. 3B are fragmentary diagrammatic views of a standard cell 100, in portion or entirety, according to various aspects of the present disclosure. FIG. 3A is a top, plan view of standard cell 100, and FIG. 3B is a diagrammatic cross-sectional view of standard cell 100 along line A-A of FIG. 3A. FIGS. 4A-4C are top, plan views of various layers of standard cell 100 of FIG. 3A according to various aspects of the present disclosure. For example, FIG. 4A is a top, plan view of a device layer DL, a contact CO level, and a V0 layer of an MLI interconnect (e.g., DL/CO/V0), in portion or entirety, of standard cell 100; FIG. 4B is a top, plan view of V0 level, M1 level, and V1 level of MLI interconnect (e.g., V0/M1/V1), in portion or entirety, of standard cell 100; and FIG. 4C is a top, plan view of M1 level, V1 level, and M2 level of MLI interconnect (e.g., M1/V1/M2), in portion or entirety, of standard cell 100. FIG. 3A, FIG. 3B, and FIGS. 4A-4C have been simplified for the sake of clarity to better understand the inventive concepts of the present disclosure. Additional features can be added in standard cell 100, and some of the features described can be replaced, modified, or eliminated in other embodiments of standard cell 100.

Standard cell 100 has a cell boundary LC, which has a first dimension, such as a cell width W, along a first direction (e.g., an x-direction) and a second dimension, such as a cell height H, along a second direction (e.g., a y-direction). In some embodiments, cell height H is less than or equal to about 250 nm. Cell width W can be greater than cell height H (e.g., a ratio of cell width W to cell height H is greater than one), less than cell height H (e.g., a ratio of cell width W to cell height H is less than one), or the same as cell height H (e.g., a ratio of cell width W to cell height H equals one). Where standard cells 100 are repeated and arranged in a standard cell array, which may be a logic cell array or a memory array, in region 20 and/or region 30, cell width W and cell height H may represent an x-pitch and y-pitch of the standard cell array along the x-direction and the y-direction, respectively. Standard cells of the standard cell array have the same cell heights and different cell widths, different cell heights and the same cell widths, or the same cell heights and the same cell widths.

As noted, standard cell 100 includes device layer DL and multilayer interconnect MLI, which may be configured to provide a logic circuit. Device layer DL includes active (OD) regions (lines), such as active region 105, and gate (poly) lines, such as a gate line 110A, a gate line 110B, a gate line 110C, and a gate line 110D. Active regions, such as active region 105, are oriented substantially parallel to one another and extend lengthwise along the x-direction (i.e., length is along the x-direction, width is along the y-direction, and height is along the z-direction). Gate lines 110A-110D are oriented substantially orthogonal to active region 105. For example, gate lines 110A-110D are oriented substantially parallel to one another and extend lengthwise along the y-direction (i.e., length is along the y-direction, width is along the x-direction, and height is along the z-direction). Gate lines 110A-110D have a spacing therebetween along the x-direction and a gate pitch GP along the x-direction. Gate pitch GP refers to a lateral distance between edges of directly adjacent gate lines 110A-110D, which can be provided by a sum of a width of gate lines 110A-110D (along the x-direction) and a spacing between directly adjacent gate lines 110A-110D (e.g., a spacing between gate line 110A and gate line 110B). In some embodiments, gate pitch GP is less than or equal to about 60 nm. In some embodiments, gate pitch GP is provided by a lateral distance between centers of directly adjacent gate lines 110A-110D.

Active regions include channel regions (C), source regions, and drain regions. Source regions and drain regions are collectively referred to as source/drain regions (S/D). In FIG. 3B, active region 105 has a channel layer 116 (i.e., channel region) disposed between epitaxial source/drains 118 (i.e., source/drain regions), and a gate line 110B is disposed on channel layer 116 and between epitaxial source/drains 118. A transistor of device layer DL is formed from active region 105 (having channel layer 116 and epitaxial source/drains 118) and gate line 110B. Gate line 110B engages channel layer 116 in a manner that facilitates the flow of current through channel 116 and between epitaxial source/drain features 118. Gate line 110B is similar to gate structures 70. For example, gate line 110 includes a gate stack having a gate electrode, similar to gate electrode 80, and a gate dielectric, similar to gate dielectric 82. Gate line 110B further includes gate spacers, similar to gate spacers 86, along sidewalls of the gate stack. Gate line 110A, gate line 110C, and gate line 110D may also have gate stacks and gate spacers.

In some embodiments, the transistor is a planar-based transistor, active region 105 is a planar-based active region, and channel layer 116 and epitaxial source/drains 118 are formed in a portion of the semiconductor substrate. In some embodiments, the transistor is a GAA transistor, active region 105 is a GAA-based active region, and channel layer 116 is formed from one or more semiconductor layers that are suspended over a semiconductor substrate and extend between epitaxial source/drains 118. In such embodiments, gate line 110B surrounds channel regions of the suspended semiconductor layer(s) (i.e., suspended channel layer 116) in the x-z plane and the y-z plane, and epitaxial source/drains 118 are disposed over and may extend into the semiconductor substrate. In some embodiments, the transistor is a FinFET, active region 105 is a FinFET-based active region, and channel layer 116 is formed from one or more semiconductor fins extending from a semiconductor substrate and extending between epitaxial source/drains 118. In such embodiments, gate line 110B wraps channel regions of the semiconductor fin(s) (i.e., channel layers 116) in the y-z plane, and epitaxial source/drains 118 are disposed over and may extend into the semiconductor substrate.

In embodiments where active regions are FinFET-based active regions and/or GAA-based active regions, active regions may have a spacing therebetween along the y-direction and a fin pitch FP along the y-direction. Fin pitch FP refers to a lateral distance between edges of directly adjacent fins (or suspended semiconductor layers) (i.e., directly adjacent active regions 105), which can be provided by a sum of a width of the fins (or suspended semiconductor layers) along the y-direction and a spacing between directly adjacent fins (or suspended semiconductor layers) along the y-direction. In some embodiments, cell height H is configured relative to fin pitch FP. For example, cell height H is less than or equal to about ten times a fin pitch FP of standard cell 100 (i.e., cell height H≤10*fin pitch FP). In some embodiments, fin pitch FP is provided by a lateral distance between centers of directly adjacent fins.

Multilayer interconnect MLI includes CO level (having source/drain contacts MD), V0 level (having source/drain vias V0 and gate vias VG), M1 level (having M1 lines), V1 level (having vias V1), and M2 level (having M2 lines). CO level includes a source/drain contact 120A, a source/drain contact 120B, and a source/drain contact 120C. V0 level includes a source/drain via 125A, a source/drain via 125B, a source/drain via 125C, and a gate via 130A. M1 level includes signal lines (e.g., a signal line 135A, a signal line 135B, a signal line 135C, a signal line 135D, and a signal line 135E) and power lines (e.g., a power line 140A and a power line 140B). V1 level includes a via 145A, and M2 level includes a conductive line 150A. A number of signal lines in standard cell 100 is greater than a number of power lines. In some embodiments, standard cell 100 has three to eight signal lines and one to two power lines. Signal lines 135A-135E, power line 140A, and power line 140B, can be electrically connected to a voltage by upper routing layers (e.g., V1 level, M2 level, and so on). The voltage may be a positive supply voltage (e.g., $V_{DD}$), a ground voltage (e.g., $V_{SS}$), or other suitable voltage.

CO level electrically connects device layer DL to V0 level, V0 level electrically connects CO level and/or device layer DL to M1 level, and V1 level electrically connects M1 level to M2 level. Source/drain contacts 120A-120C are between, physically contact, and connect respective epitaxial source/drains 118 and source/drain vias 125A-125C, respectively. Source/drain via 125A is between, physically contacts, and connects source/drain contact 120A and signal line 135B. Source/drain via 125B is between, physically contacts, and connects source/drain contact 120B and power line 140A. Source/drain via 125C is between, physically contacts, and connects source/drain contact 120C and power line 140A. Gate via 130 is between, physically contacts, and connects gate line 110B to signal line 135C. Via 145A is between, physically contacts, and connects signal line 135C to conductive line 150A. In some embodiments, multilayer interconnect MLI electrically connects the transistor of device layer to one or more voltages (e.g., $V_{DD}$ and/or $V_{SS}$), which can facilitate biasing of the transistor to achieve desired operation. In the depicted embodiment, a source of the transistor (e.g., one of epitaxial source/drains 118) is electrically connected to power line 140A of M1 level by source/drain via 125B and source/drain contact 120B, a drain of the transistor (e.g., one of epitaxial source/drains 118) is electrically connected to signal line 135B of M1 level by source/drain via 125A and source/drain contact 120A, and a gate of the transistor (e.g., gate line 110B) is electrically connected to a signal line of M1 level, such as one of signal lines 135A-135E. In some embodiments, multilayer interconnect MLI electrically connects the transistor to one or more other devices, such as devices of device layer DL, devices within multilayer interconnect MLI, devices in other standard cells or other regions of an IC, etc.

Conductive features of CO layer, M1 layer, and M2 layer are routed along a first routing direction or a second routing direction that is different than the first routing direction. For example, the first routing direction is the y-direction (and substantially parallel with the lengthwise direction of gate lines 110A-110D) and the second routing direction is the x-direction (and substantially parallel with the lengthwise direction of active region 105). In the depicted embodiment, source/drain contacts 120A-120C have longitudinal (lengthwise) directions substantially along the y-direction (i.e., first routing direction), M1 lines (i.e., signal lines 135A-135E, power line 140A, and power line 140B) have longitudinal (lengthwise) directions substantially along the x-direction (i.e., second routing direction), and M2 lines (i.e., conductive line 150A) have longitudinal (lengthwise) directions substantially along the y-direction (i.e., first routing direction). In other words, a longest dimension (e.g., length) of source/drain contacts 120A-120C and conductive line 150 is along the y-direction, and a longest dimension of signal lines 135A-135E, power line 140A, and power line 140B is along the x-direction. A shortest dimension (e.g., width) of source/drain contacts 120A-120C and conductive line 150 is along the x-direction, and a shortest dimension of signal lines 135A-135E, power line 140A, and power line 140B is along the y-direction. For example, signal lines 135A-135E have a width W1 along the y-direction, and power line 140A and power line 140B have a width W2 along the y-direction. In the depicted embodiment, width W2 is greater than width W1. In some embodiments, width W2 is at least 20% greater than width W1. In some embodiments, power line 140A and power line 140B have different widths. In some embodiments, signal lines 135A-135E have different widths. In some embodiments, any width difference in signal lines 135A-135E is less than or equal 20%.

Source/drain contacts 120A-120C, signal lines 135A-135E, power line 140A, power line 140B, and conductive line 150A are substantially rectangular-shaped (i.e., having lengths greater than widths). Source/drain vias 125A-125C and via 145A are substantially square-shaped (i.e., having lengths about equal to widths). Gate via 130 is substantially circular-shaped or oval-shaped. Source/drain contacts 120A-120C, source/drain vias 125A-125C, gate via 130, signal lines 135A-135E, power line 140A, power line 140B, via 145A, and conductive line 150A having different shapes, different sizes, different combinations of shapes and/or sizes, etc. to optimize and/or improve performance (e.g., reduce resistance) and/or layout footprint (e.g., reduce density) of standard cell 100.

Figure 5B:
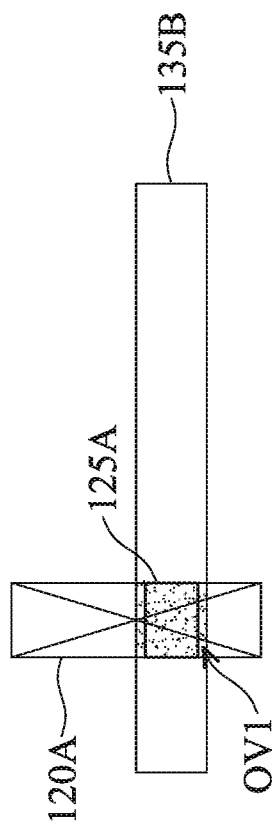
FIG. 5A and FIG. 5B are top, plan views of portions of the layout of the standard cell of FIG. 3A and FIG. 3B according to various aspects of the present disclosure.
Figure 5A:
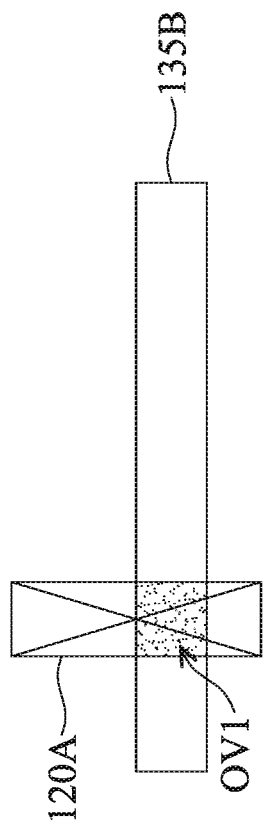

In some embodiments, sizes of source/drain vias 125A-125C are configured to fill and/or span a given amount of overlap region between their respective M1 lines and respective source/drain contacts MD. For example, turning to FIG. 5A, source/drain contact 120A and signal line 135B are illustrated without source/drain via 125A therebetween, and an overlap region OV1 (which is a shaded region) indicates where signal line 135B and source/drain contact 120A overlap one another. Turning to FIG. 5B, source/drain via 125A is between and connects source/drain contact 120A and signal line 135B, and dimensions of source/drain via 125A are configured to substantially cover overlap region OV1. For example, an area of source/drain via 125A fills and/or spans about 50% to about 100% of overlap region OV1. In FIG. 5B, an area of source/drain via 125A nears 100% (e.g., 90%) of overlap region OV1, and thus, almost fills overlap region OV1. Source/drain via 125A is bounded within overlap region OV1 and does not extend beyond overlapping portions of signal line 135A and source/drain contact 120A.

Figure 6B:
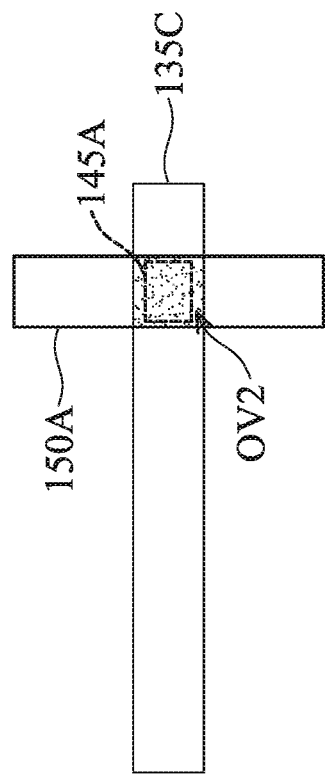
FIG. 6A and FIG. 6B are top, plan views of portions of the layout of the standard cell of FIG. 3A and FIG. 3B according to various aspects of the present disclosure.
Figure 6A:
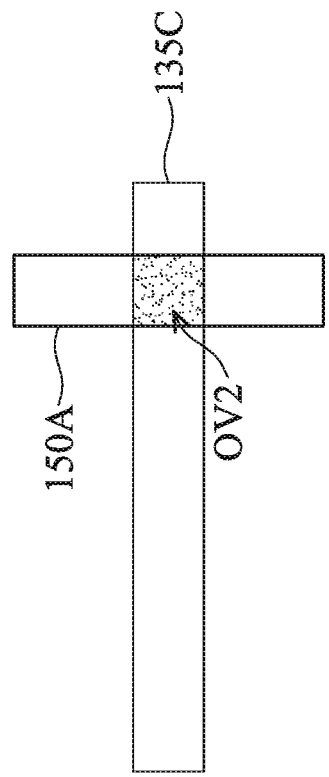

In some embodiments, sizes of V1 vias, such as via 145A, are configured to fill and/or span a given amount of overlap region between their respective M2 lines and respective M1 lines. For example, turning to FIG. 6A, signal line 135C and conductive line 150A are illustrated without via 145A therebetween, and an overlap region OV2 (which is a shaded region) indicates where signal line 135C and conductive line 150A overlap one another. Turning to FIG. 6B, via 145A is between and connects signal line 135C and conductive line 150A, and dimensions of via 145A are configured to substantially cover overlap region OV2. For example, an area of via 145A fills and/or spans about 50% to about 100% of overlap region OV2. In FIG. 6B, an area of via 145A nears 100% (e.g., 90%) of overlap region OV2, and thus, almost fills overlap region OV2. Via 145A is bounded within overlap region OV2 and does not extend beyond overlapping portions of signal line 135C and conductive line 150A.

The present disclosure proposes modulating widths of M1 lines of M1 level to optimize power performance or signal performance of standard cell 100. For example, widths of M1 lines are correlated with dimensions of V0 vias (e.g., source/drain vias), dimensions of V1 vias, and dimensions of M2 lines, such that changes to widths of the M1 lines result in changes to dimensions of the V0 vias, V1 vias, M2 lines, or combinations thereof.

Figure 8:
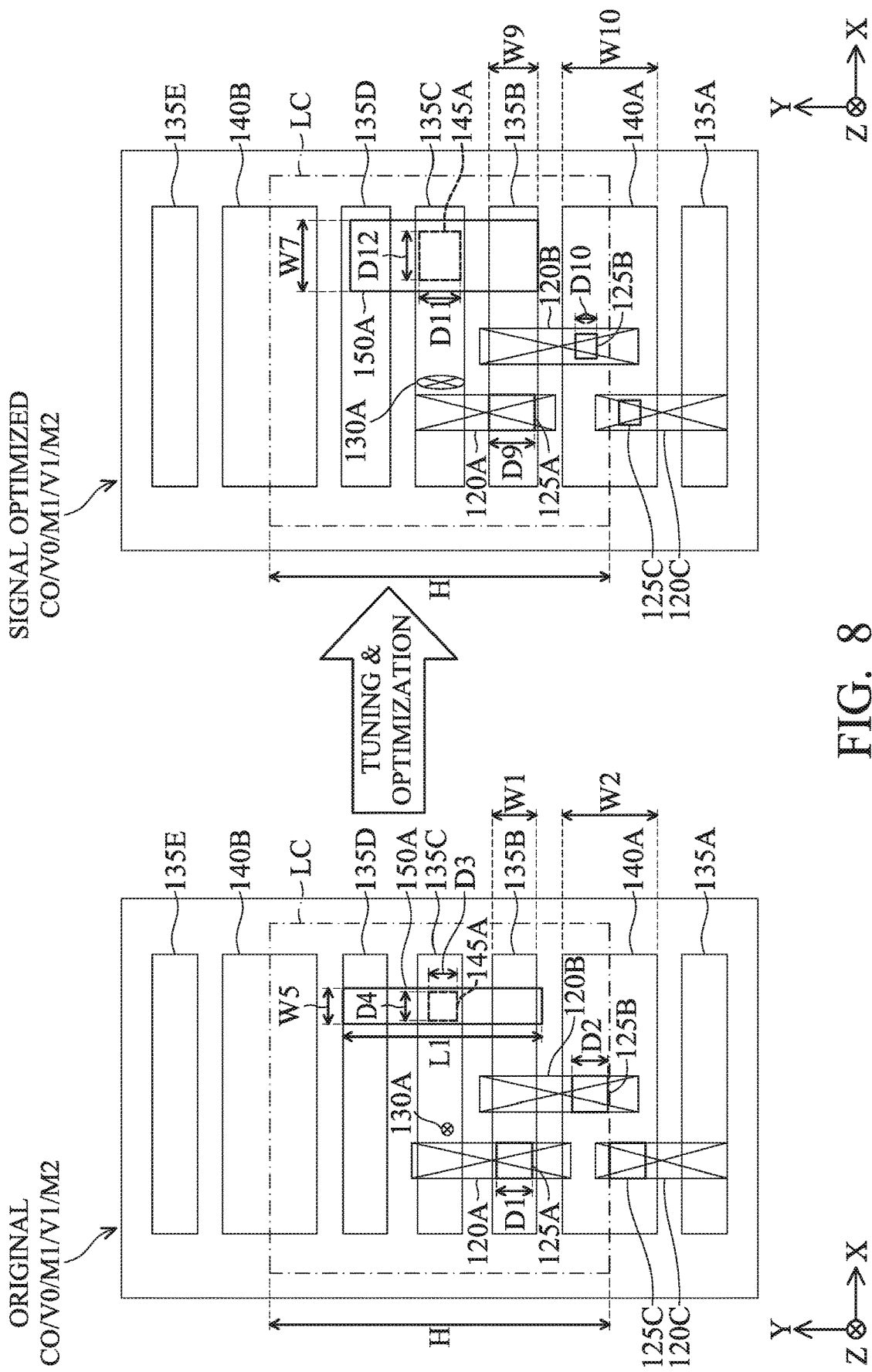
FIG. 8 illustrates signal performance optimization on the layout of the standard cell of FIG. 3A and FIG. 3B according to various aspects of the present disclosure.

FIG. 7 and FIG. 8 illustrate tuning dimensions of M1 level (and V0 level and V1 level connected thereto), in portion or entirety, to optimize performance of standard cell 100 according to various aspects of the present disclosure. FIG. 7 and FIG. 8 are top, plan views of a layout of multilayer interconnect MLI, in portion or entirety, of standard cell 100 before and after power performance optimization and signal performance optimization, respectively, such as an original (input) CO/V0/M1/V1/M2 layout and an optimized (output) CO/V0/M1/V1/M2 layout. FIG. 7 and FIG. 8 have been simplified for the sake of clarity to better understand the inventive concepts of the present disclosure. Additional features can be added in depicted CO/V0/M1/V1/M2 layouts, and some of the features described can be replaced, modified, or eliminated in other embodiments of CO/V0/M1/V1/M2 layouts.

Turning to FIG. 7, the layout of multilayer interconnect MLI is modified to optimize power performance of standard cell 100 without changing cell height H thereof, for example, by enlarging (increasing) widths of power lines of M1 level, which correspondingly allows for enlarging (increasing) sizes/dimensions of interconnects connected to the power lines, such as source/drain vias and vias. Enlarging the power lines and interconnects connected thereto (e.g., source vias and/or source contacts) can reduce resistance associated with the power lines and correspondingly improve power performance of standard cell 100. In some embodiments, widths of the power lines are selected that correspondingly increase dimensions of source vias to dimensions that can reduce resistance and/or improve speed of electrical signals through the power lines, source vias, and source/drain contacts. To maintain cell height H, the layout of multilayer interconnect MLI is further modified by shrinking (decreasing) widths of signal lines of M1 level to offset enlargement of the power lines and ensure dimensions of M1 level remain suitable for cell height H. Though shrinking the signal lines (and corresponding interconnects) may increase resistance thereof, such increases may be considered negligible when standard cell 100 is implemented in applications that benefit from standard cells having optimal power performance. Width adjustments to M1 level are thus made that optimize power performance of standard cell 100 within process capabilities for M1 level (e.g., dimensions that can be fabricated using existing fabrication techniques for standard cell 100 and/or dimensions that are not too small or too large) and cell height H (which can avoid complete redesign of the layout).

For example, in power performance optimized CO/V0/M1/V1/M2 layout, signal lines 135A-135E have a width W3 that is less than width W1, and power line 140A and power line 140B have a width W4 that is greater than width W2. Width W3 is less than width W4. In other words, the power performance optimization increases widths of the power lines and decreases widths of the signal lines. To maintain cell height H, any width increases in the power lines are offset by width decreases in signal lines (i.e., signal lines 135A-135E shrink in response to enlargement of power line 140A and power line 140B). Width enlargements/shrinking of the power lines and/or the signal lines is less than or equal to about 20%. That is, widths W4 are no more than about 20% greater than widths W2, and widths W3 are no more than about 20% less than widths W1. In some embodiments, width decreases of signal lines 135A-135E are the same as width increases of power line 140A and power line 140B. For example, if widths of power line 140A and power line 140B increase 10%, widths of signal lines 135A-135E decrease 10%.

In some embodiments, an average power line width adjustment ($\Delta$WP) of M1 level (here, power line 140A and power line 140B) is less than or equal to 20%. That is, power line width adjustments can be distributed among power lines. For example, power line 140A may be enlarged by more than 20% and power line 140B may be enlarged by less than 20%, where the width enlargements of power line 140A and power line 140B are tuned to provide an average power line width adjustment that is less than or equal to 20%. In some embodiments, after the power line width adjustments, an area of standard cell 100 and/or M1 level consumed by the power lines after power performance optimization is up to 20% greater than an area of standard cell 100 and/or M1 level consumed by the power lines before power performance optimization.

In some embodiments, an average signal line width adjustment ($\Delta$WS) of M1 level (here, signal lines 135A-135E) is less than or equal to 20%. That is, signal line width adjustments can be distributed among signal lines. For example, some of signal lines 135A-135E may be shrunk by more than 20% and some of signal lines 135A-135E may be shrunk by less than 20%, where the width shrinking of signal lines 135A-135E are tuned to provide an average signal line width adjustment that is less than or equal to 20%. In some embodiments, after the signal line width adjustments, an area of standard cell 100 and/or M1 level consumed by the signal lines after power performance optimization is up to 20% less than an area of standard cell 100 and/or M1 level consumed by the signal lines before power performance optimization.

Dimensions and/or sizes of interconnects connected to M1 lines in M1 level, such as those in V0 level and V1 level, can also be adjusted and/or optimized in response to enlargement/shrinking of M1 lines. For example, tuning/optimization can include enlarging widths and/or lengths of source vias connected to the power lines (e.g., source/drain via 125B and source/drain via 125C connected to power line 140A), shrinking widths and/or lengths of V1 vias connected to the signal lines (e.g., via 145A connected to signal line 135C), and shrinking widths of M2 lines connected to the signal lines (e.g., conductive line 150A connected to signal line 135C by via 145A). In FIG. 7, in original CO/V0/M1/V1/M2 layout, source/drain via 125A has a dimension D1 along the y-direction, source/drain vias 125B and source/drain via 125C have a dimension D2 along the y-direction, via 145A has a dimension D3 along the y-direction and a dimension D4 along the x-direction, and conductive line 150A has a width W5 along the x-direction. Dimension D1 is less than width W1, dimensions D2 is less than width W2, dimension D3 is less than width W1, and dimension D4 is less than width W5. Dimension D1 can be less than greater than, or equal to dimension D2 in various embodiments.

After power performance tuning/optimization, in power performance optimized CO/V0/M1/V1/M2 layout, source/drain via 125A (e.g., a drain via) has a dimension D5 along the y-direction, source/drain via 125B and source/drain via 125C (e.g., source vias) have a dimension D6 along the y-direction, via 145A has a dimension D7 along the y-direction and a dimension D8 along the x-direction, and conductive line 150A has a width W6 along the x-direction. Dimension D5 is less than dimension D1, dimension D6 is greater than dimension D2, dimension D7 is less than dimension D3, dimension D8 is less than dimension D4, and width W6 is less than width W5. Accordingly, in response to enlarging widths of power line 140A and power line 140B, dimensions of source vias (e.g., source/drain via 125B and source/drain via 125C) enlarge, dimensions of drain vias (e.g., source/drain via 125A) shrink, and dimensions of a routing layer directly above signal lines 135A-135E (e.g., via 145A and conductive line 150A) shrink. In some embodiments, in response to shrinking of signal lines 135A-135E (resulting from enlarging power line 140A and power line 140B), dimensions of gate via 130 may also be reduced. Such dimension changes in CO level, M1 level, and V1 level increase contact area between power line 140A and power line 140B and their overlying/underlying interconnects, thereby reducing resistance of power line interconnect structures.

In some embodiments, size/dimension adjustments of source/drain vias are configured to ensure that source/drain vias substantially cover overlap regions between source/drain contacts MD and M1 lines. For example, in power performance optimized CO/V0/M1/V1/M2 layout, an area of source/drain via 125A fills and/or spans about 50% to about 100% of an overlap region between source/drain contact 120A and signal line 135B, an area of source/drain via 125B fills and/or spans about 50% to about 100% of an overlap region between source/drain contact 120B and power line 140A, and an area of source/drain via 125C fills and/or spans about 50% to about 100% of an overlap region between source/drain contact 120C and power line 140A. In some embodiments, size/dimension adjustments of V1 vias are configured to ensure that V1 vias substantially covers overlap regions between M1 lines and M2 lines. For example, in power performance optimized CO/V0/M1/V1/M2 layout, an area of via 145A fills and/or spans about 50% to about 100% of an overlap region between signal line 135C and conductive line 150A. In some embodiments, source/drain vias 125A-125C and via 145A may be bounded by the overlap regions. For example, dimension D5 is less than width W3, dimension D6 is less than width W4, dimension D7 is less than width W3, and dimension D8 is less than dimension W6.

Turning to FIG. 8, the layout of multilayer interconnect MLI is modified to optimize signal performance of standard cell 100 without changing cell height H thereof, for example, by enlarging (increasing) widths of signal lines of M1 level, which correspondingly allows for enlarging (increasing) sizes/dimensions of interconnects connected to the signal lines, such as source/drain vias, vias, and M2 lines. Enlarging the signal lines and interconnects connected thereto (e.g., drain vias, gate vias, vias, and M2 lines) can reduce resistance associated with the signal lines and correspondingly improve signal performance of standard cell 100. In some embodiments, widths of the signal lines are selected that correspondingly increase dimensions of drain vias, gate vias, vias, M2 lines, or combinations thereof to dimensions that can reduce resistance and/or improve speed of electrical signals through the signal lines, drain vias, gate vias, vias, and M2 lines. To maintain cell height H, the layout of multilayer interconnect MLI is further modified by shrinking (decreasing) widths of power lines of M1 level to offset enlargement of the signal lines and ensure dimensions of M1 level remain suitable for cell height H. Though shrinking the power lines (and corresponding interconnects) may increase resistance thereof, such increases may be considered negligible when standard cell 100 is implemented in applications that benefit from standard cells with optimal signal performance. Width adjustments to M1 level are thus made that optimize signal performance of standard cell within process capabilities for M1 level (e.g., dimensions that can be fabricated using existing fabrication techniques for standard cell 100 and/or dimensions that are not too small or too large) and cell height H (which can avoid complete redesign of the layout).

For example, in signal performance optimized CO/V0/M1/V1/M2 layout, signal lines 135A-135E have a width W9 that is greater than width W1, and power line 140A and power line 140B have a width W10 that is less than width W2. Width W9 is less than width W10. In other words, the signal performance optimization increases widths of the signal lines and decreases widths of the power lines. To maintain cell height H, any width increases in the signal lines are offset by width decreases in power lines (i.e., power line 140A and power line 140B shrink in response to enlargement of signal lines 135A-135E). Width enlargements/shrinking of the signal lines and/or the power lines is less than or equal to about 20%. That is, widths W9 are no more than about 20% greater than widths W1, and widths W10 are no more than about 20% less than widths W2. In some embodiments, width increases of signal lines 135A-135E are the same as width decreases of power line 140A and power line 140B. For example, if widths of signal lines 135A-135E increase 10%, widths of power line 140A and power line 140B decrease 10%.

In some embodiments, an average signal line width adjustment of M1 level (here, signal lines 135A-135E) is less than or equal to 20%. That is, signal line width adjustments can be distributed among signal lines. For example, some of signal lines 135A-135E may be enlarged by more than 20% and some of signal lines 135A-135E may be enlarged by less than 20%, where the width enlargements of signal lines 135A-135E are tuned to provide an average signal line width adjustment that is less than or equal to 20%. In some embodiments, after the signal line width adjustments, an area of standard cell 100 and/or M1 level consumed by the signal lines after signal performance optimization is up to 20% greater than an area of standard cell 100 and/or M1 level consumed by the signal lines before signal performance optimization.

In some embodiments, an average power line width adjustment of M1 level (here, power line 140A and power line 140B) is less than or equal to 20%. That is, power line width adjustments can be distributed among the power lines. For example, power line 140A may be shrunk by more than 20% and power line 140B may be shrunk by less than 20%, where the width shrinking of power line 140A and power line 140B are tuned to provide an average power line width adjustment that is less than or equal to 20%. In some embodiments, after the power line width adjustments, an area of standard cell 100 and/or M1 level consumed by the power lines after power performance optimization is up to 20% less than an area of standard cell 100 and/or M1 level consumed by the power lines before power performance optimization.

Dimensions and/or sizes of interconnects connected to M1 lines in M1 level, such as those in V0 level and V1 level, can also be adjusted and/or optimized in response to enlargement/shrinking of M1 lines. For example, tuning/optimization can include enlarging widths and/or lengths of drain vias connected to the signal lines (e.g., source/drain via 125A connected to signal line 135B), enlarging widths and/or lengths of V1 vias connected to the signal lines (e.g., via 145A connected to signal line 135C), and enlarging widths of M2 lines connected to the signal lines (e.g., conductive line 150A connected to signal line 135C by via 145A). In FIG. 8, in original CO/V0/M1/V1/M2 layout, source/drain via 125A has dimension D1, source/drain vias 125B and source/drain via 125C have dimension D2, via 145A has dimension D3 and dimension D4, and conductive line 150A has width W5. After signal performance tuning/optimization, in signal performance optimized CO/V0/M1/V1/M2 layout, source/drain via 125A (e.g., a drain via) has a dimension D9 along the y-direction, source/drain via 125B and source/drain via 125C (e.g., source vias) have a dimension D10 along the y-direction, via 145A has a dimension D11 along the y-direction and a dimension D12 along the x-direction, and conductive line 150A has a width W7 along the x-direction. Dimension D9 is greater than dimension D1, dimension D10 is less than dimension D2, dimension D11 is greater than dimension D3, dimension D12 is greater than dimension D4, and width W7 is greater than width W5. Accordingly, in response to enlarging widths of signal lines 135A-135E, dimensions of drain vias (e.g., source/drain via 125A) enlarge, dimensions of a routing layer directly above signal lines 135A-135E (e.g., via 145A and conductive line 150A) enlarge, and dimensions of source vias (e.g., source/drain via 125B and source/drain via 125C) shrink. In some embodiments, in response to enlarging of signal lines 135A-135E, dimensions of gate via 130 may also be increased along the x-direction and/or the y-direction. Such dimension changes in CO level, M1 level, and V1 level increase contact area between signal lines 135A-135E and their overlying/underlying interconnects, thereby reducing resistance of signal line interconnect structures.

In some embodiments, size adjustments of source/drain vias are configured to ensure that source/drain vias substantially cover overlap regions between source/drain contacts MD and M1 lines. For example, in signal performance optimized CO/V0/M1/V1/M2 layout an area of source/drain via 125A fills and/or spans about 50% to about 100% of an overlap region between source/drain contact 120A and signal line 135B. In some embodiments, size/dimension adjustments of V1 vias are configured to ensure that V1 vias substantially cover overlap regions between M1 lines and M2 lines. For example, in signal performance optimized CO/V0/M1/V1/M2 layout, an area of via 145A fills and/or spans about 50% to about 100% of an overlap region between signal line 135C and conductive line 150. In some embodiments, source/drain vias and/or V1 vias are bounded by the overlap regions. For example, dimension D9 is less than width W9, and a dimension of source/drain via 125A along the x-direction is less than a dimension of source/drain contact 120A along the x-direction. In another example, dimension D11 is less than width W9, and a dimension D12 is less than width W7.

Figure 9:
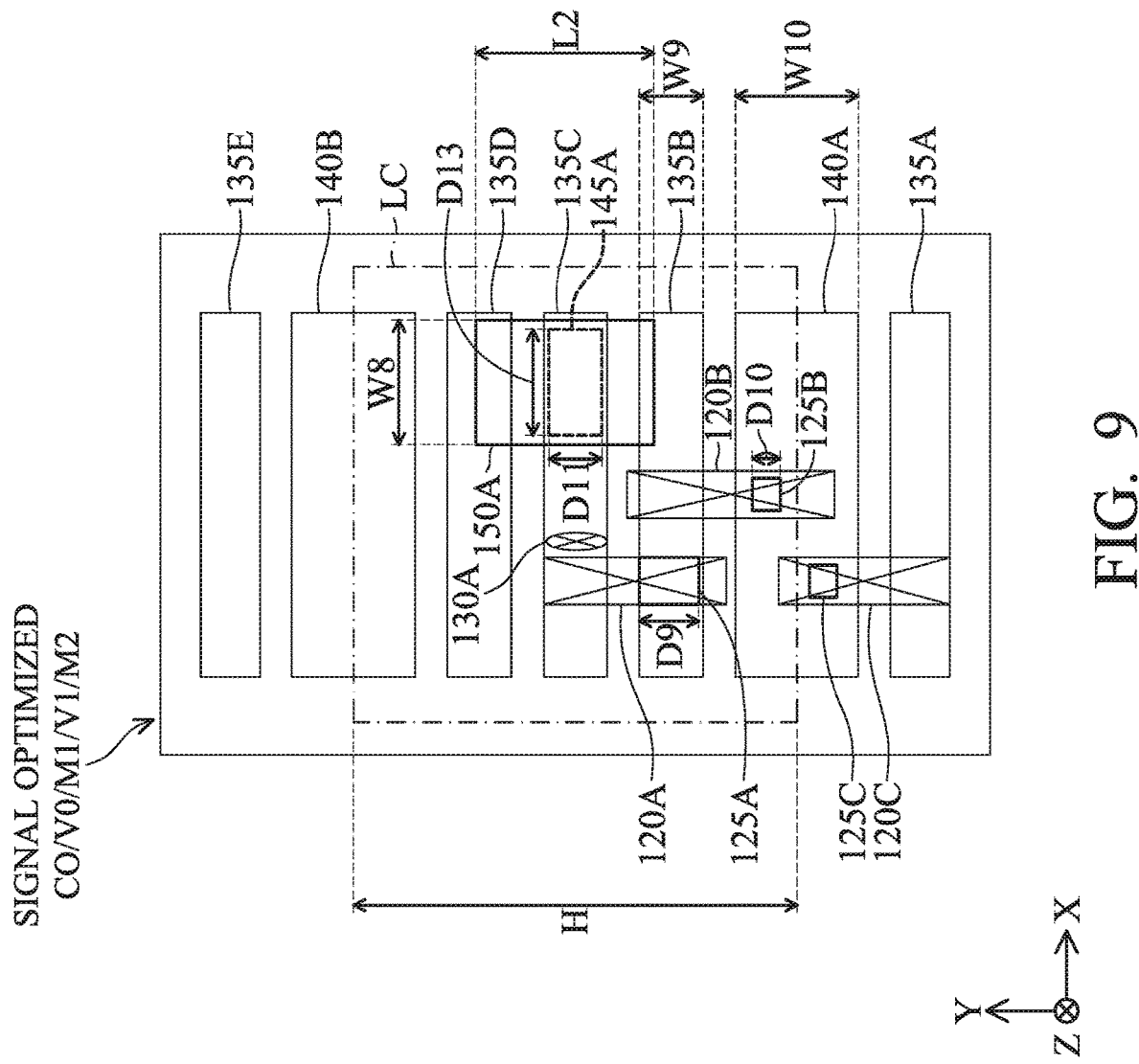
FIG. 9 illustrates signal performance optimization on the layout of the standard cell of FIG. 3A and FIG. 3B according to various aspects of the present disclosure.

The present disclosure further contemplates reducing lengths of M2 lines, such as conductive line 150A, during signal performance tuning/optimization. For example, FIG. 9 is a top, plan view of a layout of multilayer interconnect MLI, in portion or entirety, of standard cell 100 after signal performance optimization. FIG. 9 has been simplified for the sake of clarity to better understand the inventive concepts of the present disclosure. Additional features can be added in depicted CO/V0/M1/V1/M2 layout, and some of the features described can be replaced, modified, or eliminated in other embodiments of CO/V0/M1/V1/M2 layout.

Signal performance optimized CO/V0/M1/V1/M2 layout of FIG. 9 is similar to signal performance optimized CO/V0/M1/V1/M2 layout of FIG. 8, except via 145A and conductive line 150A have different dimensions. For example, in FIG. 9, conductive line 150A has a width W8 along the x-direction. Width W8 is greater than width W5, and in the depicted embodiment, is greater than width W7. In some embodiments, width W8 is about 1 times to about 3 times greater than width W5. In some embodiments, a ratio of width W8 to width W5 is about 2:1 to about 4:1. Enlarging widths of M2 lines, such as conductive line 150A, can allow for relaxing pitch of M2 level (i.e., a pitch of M2 lines can be greater in a signal performance optimized standard cell), which can lower fabrication complexity and/or fabrication cost of standard cell 100. In some embodiments, enlarging V1 vias and/or M2 lines can reduce a number of patterning processes needed to fabricate V1 vias and/or M2 lines. For example, single patterning can be implemented when fabricating V1 vias and/or M2 lines based on signal optimized CO/V0/M1/V1/M2 layout, while double patterning may be needed to fabricate V1 vias and/or M2 lines based on original CO/V0/M1/V1/M2 layout. In some embodiments, less complex and/or less costly lithography processes, etching processes, deposition processes, etc. can be implemented to fabricate larger V1 vias and/or M2 lines, such as those in signal optimized CO/V0/M1/V1/M2 layout.

In some embodiments, enlarging signal lines can allow for shrinking (decreasing) lengths of M2 lines. For example, in original CO/V0/M1/V1/M2, conductive line 150A may have a length L1 along the y-direction, and after signal performance optimization, conductive line 150A may have a length L2 along the y-direction, such as in signal performance optimized CO/VO/M1/V1/M2 of FIG. 9. Length L2 is less than length L1. In some embodiments, length L2 is about 1 times to about 0.3 times less than length L1. In FIG. 9, because width of conductive line 150A is larger, via 145A has a dimension D13 along the x-direction that is greater than dimension D3, and in the depicted embodiment, is greater than dimension D12. In some embodiments, an area of via 145A (e.g., a top contact surface area) after signal performance optimization is about 1 times to about 3.6 times greater than an area of via 145A before signal performance optimization.

Figure 10A:
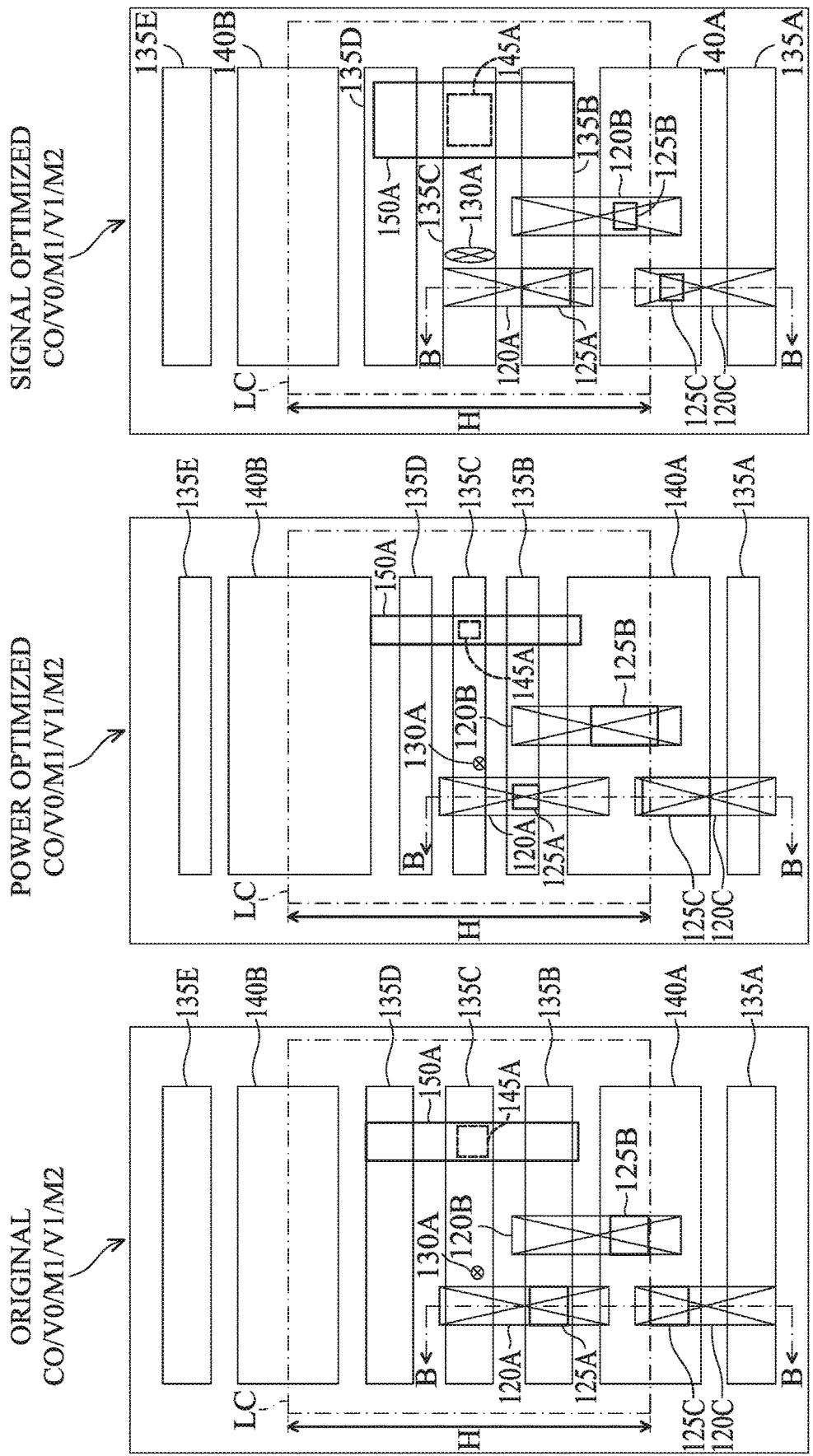
FIG. 10A depicts top, plan views of a layout of multilayer interconnect MLI, in portion or entirety, of a standard cell before optimization, after power performance optimization, and after signal performance optimization according to various aspects of the present disclosure.
Figure 10B:
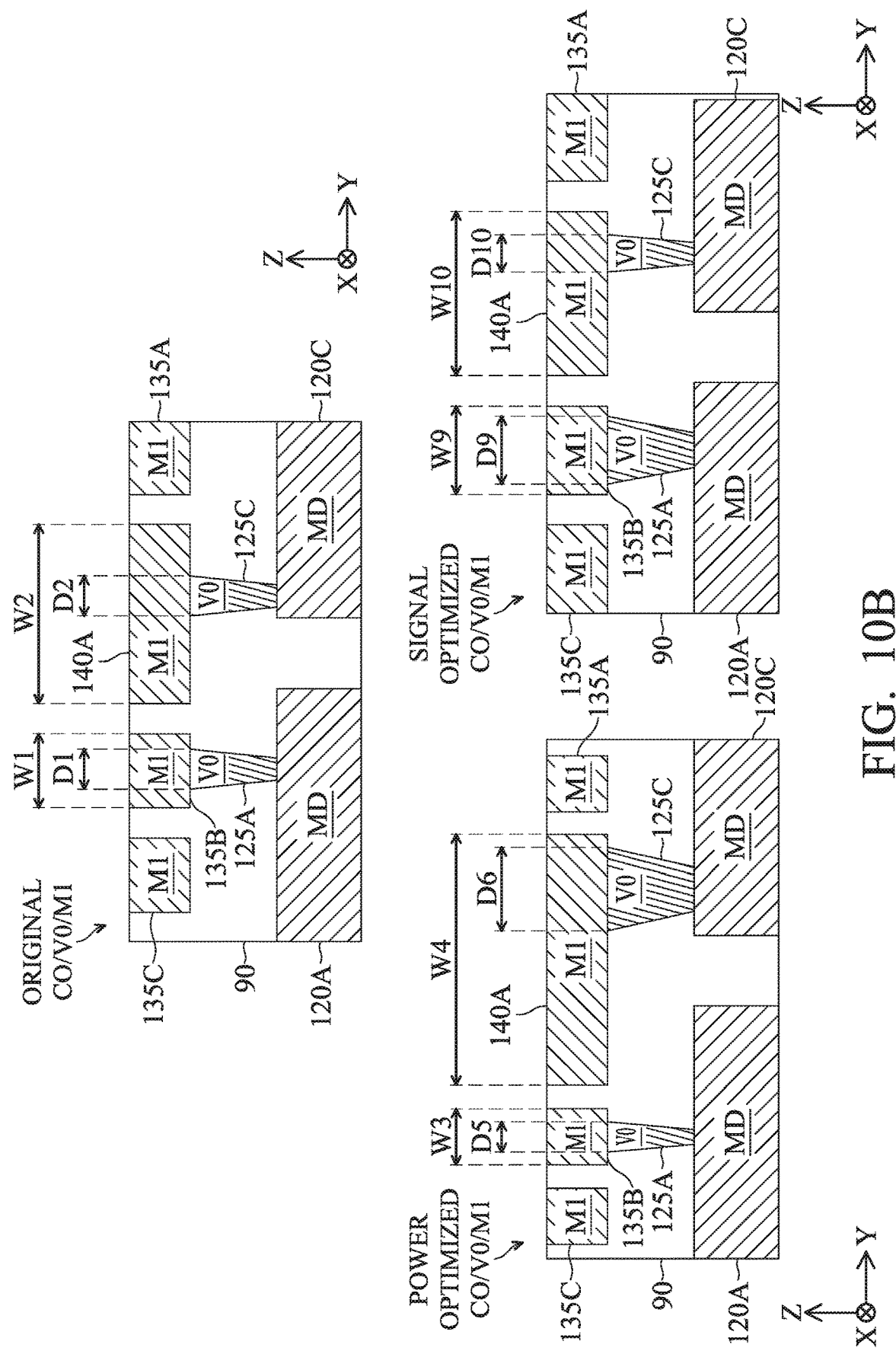
FIG. 10B depicts fragmentary diagrammatic views of a portion of a multilayer interconnect MLI fabricated based on a layout of multilayer interconnect MLI, in portion or entirety, of a standard cell before optimization, after power performance optimization, and after signal performance optimization according to various aspects of the present disclosure.

FIG. 10A depicts top, plan views of a layout of multilayer interconnect MLI, in portion or entirety, of standard cell 100 before optimization, after power performance optimization, and after signal performance optimization according to various aspects of the present disclosure. As evident from FIG. 10A, implementing the design techniques herein, standard cell 100 can be optimized for different applications (e.g., power sensitive or signal sensitive) while maintaining dimensions of cell boundary LC. FIG. 10B depicts fragmentary diagrammatic views of a portion of a multilayer interconnect MLI (e.g., a portion of CO/V0/M1) fabricated based on a layout of multilayer interconnect MLI, in portion or entirety, of a standard cell along lines B-B of FIG. 10A before optimization, after power performance optimization, and after signal performance optimization according to various aspects of the present disclosure. In the depicted embodiment, cell height H and cell width W are the same for the original layouts and the optimized layouts, thereby providing performance optimization within process capabilities for a given cell size. In some embodiments, performance optimization and/or signal optimization maintains cell height H while increasing or decreasing cell width W. FIG. 10A and FIG. 10B have been simplified for the sake of clarity to better understand the inventive concepts of the present disclosure. Additional features can be added in the layout of multilayer interconnect MLI, and some of the features described can be replaced, modified, or eliminated in other embodiments of the layout of multilayer interconnect MLI.

Figure 11:
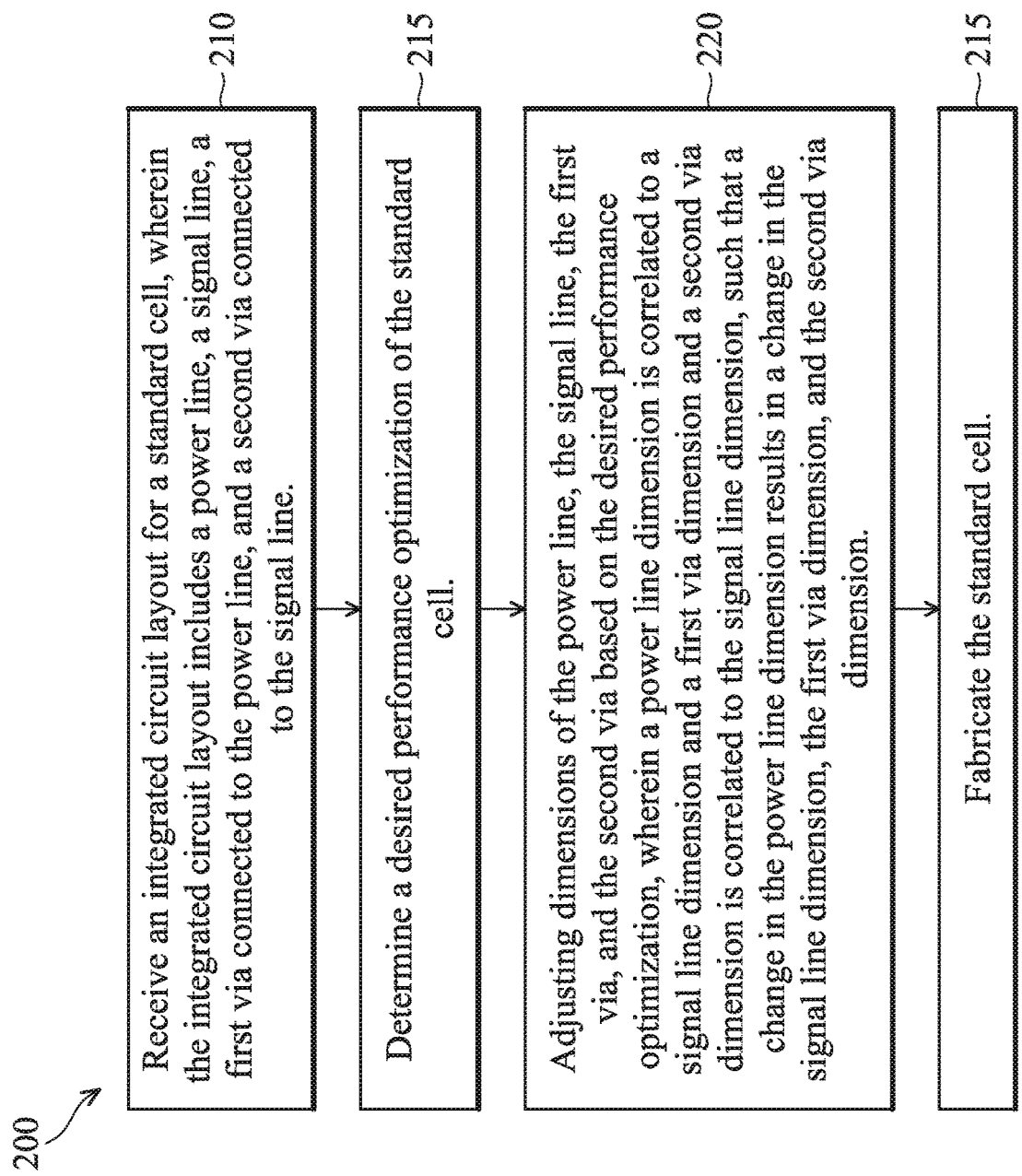
FIG. 11 is a flow chart of a method that can be implemented for standard design and/or fabrication according to various aspects of the present disclosure.

FIG. 11 is a flow chart of a method 200 that can be implemented for standard cell design and/or fabrication, such as logic design and/or logic fabrication, according to various aspects of the present disclosure. Method 200 implements the concepts described herein to optimize performance of a standard cell, such as standard cell 100. Method 200 beings at block 210 with receiving an IC layout for a standard cell. The IC layout includes a power line, a signal line, a first via connected to the power line, and a second via connected to the signal line.

In some embodiments, the power line and the signal line are a portion of an M1 level (i.e., a bottommost routing layer) of a multilayer interconnect MLI of the standard cell. In such embodiments, the first via and the second via may be source/drain vias (e.g., vias of V0 level of the multilayer interconnect MLI) or vias of a V1 level of the multilayer interconnect MLI. In some embodiments, the standard cell has a cell height.

At block 215, method 200 includes determining a desired performance optimization of the standard cell. For example, if the standard cell is used in applications that benefit from boosted power signals, the desired performance optimization is power optimization. If the standard cell is used in applications that benefit from boosted signal signals, the desired performance optimization is signal optimization. In some embodiments, such determination is based on design specifications of the standard cell. For example, the desired performance optimization is determined to be power optimization when the design specifications for the standard cell define power parameters that are difficult to obtain by fabricating the standard cell based on the received integrated circuit layout using processing capabilities for the cell size of the standard cell. In another example, the desired performance optimization is determined to be signal optimization when the design specifications define signal performance parameters that are difficult to obtain by fabricating the standard cell based on the received integrated circuit layout using processing capabilities for the cell size of the standard cell. In another example, the desired performance optimization is determined to be signal optimization when design-specified, signal dependent parameters are more difficult to obtain than design-specified, power dependent parameters using processing capabilities for the cell size of the standard cell. In another example, the desired performance optimization is determined to be power optimization when design- specified, power dependent parameters are more difficult to obtain than design-specified, signal dependent parameters using processing capabilities for the cell size of the standard cell.

In some embodiments, such determination is based on material choices for the power line, the signal line, and their associated interconnects (e.g., the first via and the second via, respectively). For example, it may be observed that power line and first via exhibit increased resistance when formed from a first conductive material, while signal line and second via exhibit less (or negligible) resistance increases when formed from the first conductive material. In such example, the desired performance optimization is determined to be power optimization to offset resistance increases that may arise from power interconnect structures being formed of the first conductive material. In another example, it may be observed that signal line and second via exhibit increased resistance when formed from a second conductive material, while power line and first via exhibit less (or negligible) resistance increases when formed from the second conductive material. In such example, the desired performance optimization is determined to be signal optimization to offset resistance increases that may arise from signal interconnect structures being formed of the second conductive material.

In some embodiments, a process simulation and/or a device simulation is performed using the integrated circuit layout to obtain information about a standard cell fabricated from the integrated circuit layout. If the simulation results indicate that power-related features and/or parameters of the standard cell are more sensitive to sizes and/or dimensions of vias, contacts, routing lines, etc. of the standard cell's multilayer interconnect, the desired performance optimization is determined to be power optimization. If the simulation results indicate that signal-related features and/or parameters of the standard cell are more sensitive to sizes and/or dimensions of vias, contacts, routing lines, etc. of the standard cell's multilayer interconnect, the desired performance optimization is determined to be signal optimization.

At block 220, method 200 includes adjusting dimensions of the power line, the signal line, the first via, and the second via based on the desired performance optimization. A power line dimension is correlated to a signal line dimension and a first via dimension, and a second via dimension is correlated to the signal line dimension. Accordingly, a change in the power line dimension results in a change in the signal line dimension, the first via dimension, and the second via dimension. For example, where the desired performance optimization is power optimization (e.g., a process budget of an M1 level of the multilayer interconnect MLI is allocated to power), method 200 includes enlarging the power line dimension and the first via dimension and shrinking the signal line dimension and the second via dimension, such as described herein. In another example, where the desired performance optimization is signal optimization (e.g., a process budget of the M1 level is allocated to signal), method 200 includes shrinking the power line dimension and the first via dimension and enlarging the signal line dimension and the second via dimension, such as described herein. Adjustments to the first via dimension (e.g., size of a source via) and the second via dimension (e.g., size of a drain via) may be constrained by a size of a transistor of the standard cell (e.g., sizes of source/drains and gate).

In some embodiments, a modified integrated circuit layout is generated by adjusting the dimensions of the power line, the signal line, the first via, and the second via based on the desired performance optimization. A cell height of the standard cell provided by the modified integrated circuit layout is the same as the cell height of the standard cell provided by the received integrated circuit layout. In some embodiments, at block 225, method 200 include fabricating the standard cell based on the modified integrated circuit layout. The standard cell may be optimized for power-based applications or signal-based applications, such as described herein. Additional steps can be provided before, during, and after method 200, and some of the steps described can be moved, replaced, or eliminated for additional embodiments of method 200.

Various conductive features of multilayer interconnects MLIs, such as contacts, vias, and/or metal lines, described herein can include tungsten, ruthenium, cobalt, copper, aluminum, iridium, palladium, platinum, nickel, other low resistivity metal constituent, alloys thereof, or combinations thereof. In some embodiments, a conductive material of source/drain vias V0 and/or gate vias VG of V0 level is different than a conductive material of M1 lines of M1 level. For example, M1 lines (e.g., signal lines 135A-135E, power line 140A, and power line 140B) include copper, while source/drain vias V0 (e.g., source/drain vias 125A-125C) and/or gate vias VG (e.g., gate via 130A) include tungsten or ruthenium. In some embodiments, a conductive material of source/drain vias V0 and/or gate vias VG of V0 layer are the same as a conductive material of M1 lines of M1 layer. In some embodiments, various layers of multilayer interconnects MLIs, such as CO level, V0 level, M1 level, V1 level, and M2 level, described herein can be fabricated by depositing a dielectric layer (e.g., an ILD layer and/or a CESL) over a substrate; performing a lithography and etching process to form one or more openings in the dielectric layer that expose one or more conductive features in an underlying layer; filling the one or more openings with a conductive material; and performing a planarization process that removes excess conductive material, such that conductive features and the dielectric layer have substantially planar surfaces. The conductive material is formed by a deposition process (e.g., PVD, CVD, ALD, etc.) and/or annealing process. In some embodiments, the conductive features include a bulk layer (also referred to as a conductive plug). In some embodiments, the conductive features include a barrier layer, an adhesion layer, other suitable layer, etc. disposed between the bulk layer and dielectric layer. In some embodiments, the barrier layer, the adhesion layer, other suitable layer, etc. include titanium, titanium alloy (e.g., TiN), tantalum, tantalum alloy (e.g., TaN), other suitable constituent, or combinations thereof. In some embodiments, a via layer (e.g., V0 level) and a metallization layer (e.g., M1 level) of multilayer interconnects MLIs can be formed by a single damascene or a dual damascene process.

Figure 12:
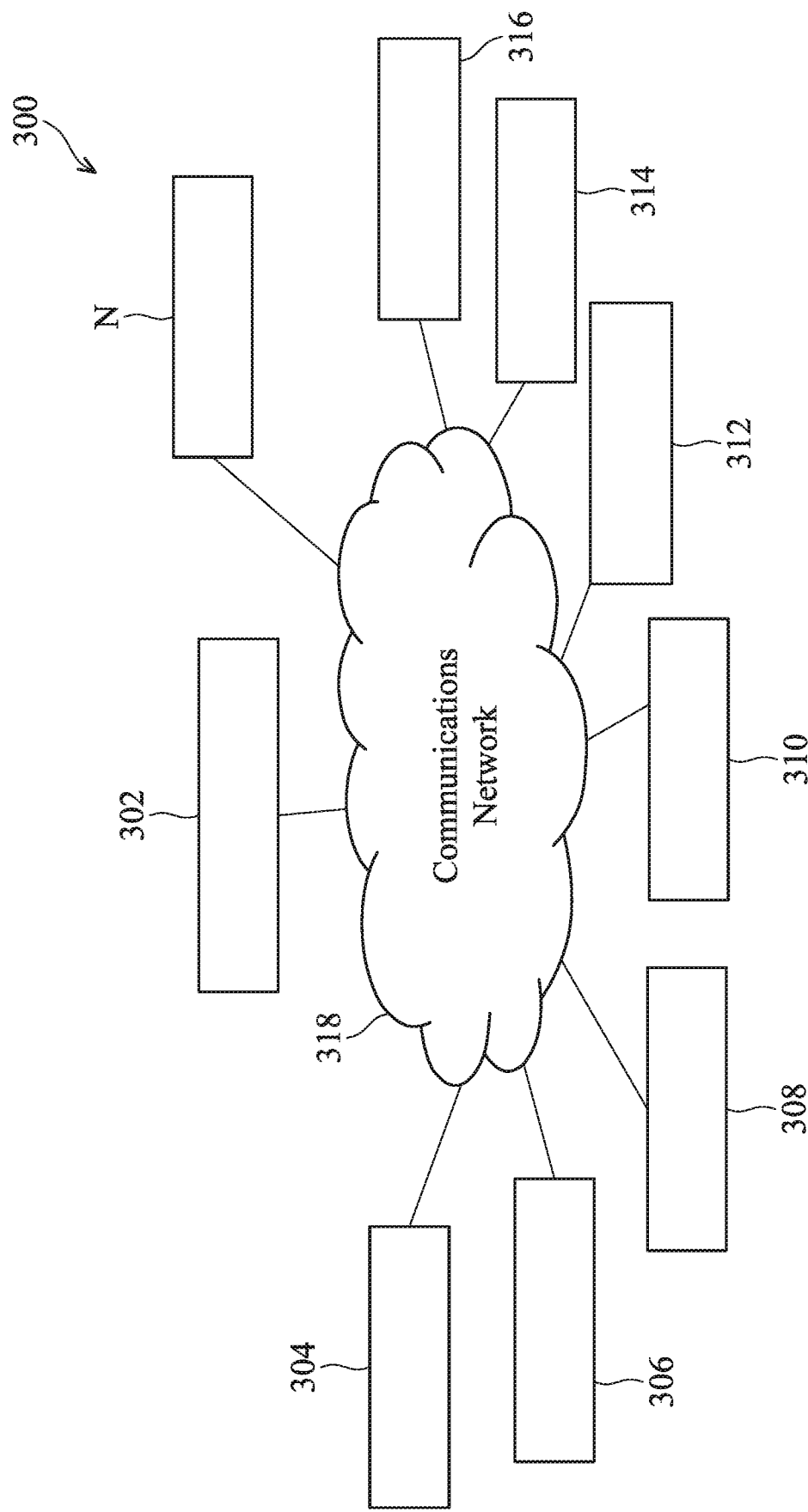
FIG. 12 illustrates an IC fabrication system, in portion or entirety, according to various aspects of the present disclosure.

FIG. 12 illustrates an IC fabrication system 300 according to various aspects of the present disclosure. IC fabrication system 300 includes a plurality of entities 302, 304, 306, 308, 310, 312, 314, 316, . . . , N that are connected by a communications network 318, which may be a single network or may be a variety of different networks, such as an intranet and the Internet, and may include both wired and wireless communication channels.

In some embodiments entity 302 represents a service system for manufacturing collaboration; entity 304 represents a user, such as a product engineer to monitor IC products; entity 306 represents an engineer, such as a processing engineer to control IC fabrication and relevant recipes, or an equipment engineer to monitor or tune conditions and settings of IC fabrication tools; entity 308 represents a metrology tool for IC testing and measurement; entity 310 represents a semiconductor and/or IC processing tool; entity 312 represents a virtual metrology module associated with entity 310; entity 314 represents an advanced processing control module associated with entity 310 and additionally other processing tools; and entity 316 represents a sampling module associated with entity 310.

Each entity may interact with other entities and may provide integrated circuit fabrication, processing control, calculating capability, etc. to and/or receive such capabilities from the other entities. Each entity may also include one or more computer systems for performing calculations and carrying out automations. For example, the advanced processing control module of entity 314 may include a plurality of computer hardware having software instructions encoded therein. The computer hardware may include hard drives, flash drives, CD-ROMs, RAM memory, display devices (e.g., monitors), input/output device (e.g., mouse and keyboard). The software instructions may be written in any suitable programming language and may be designed to carry out specific tasks, such as the tasks associated with optimizing fabrication of the standard cells described above.

IC fabrication system 300 enables interaction among the entities for the purpose of IC design and manufacturing, as well as advanced processing control of the IC manufacturing. One of the capabilities provided by IC fabrication system 300 may enable collaboration and information access in such areas as design, engineering, and processing, metrology, and advanced processing control. Another capability provided by IC fabrication system 300 may integrate systems between facilities, such as between the metrology tool and the processing tool.

Such integration enables facilities to coordinate their activities. IC fabrication system 300 may be used to perform method 200 and associated layout optimization as described herein. For example, one or more of the entities 302-316 may receive an IC layout design from a design house and thereafter revise the received IC layout design by adjusting dimensions of V0 level, M1 level, V1 level, M2 level, etc. of a multilayer interconnect MLI of a standard cell.

The present disclosure provides for many different embodiments. An exemplary method includes receiving an integrated circuit layout for a standard cell having a cell height. The integrated circuit layout includes a power line, a signal line, a first source/drain via connected to the power line, and a second source/drain via connected to the signal line. The method further includes tuning dimensions of the power line, the signal line, the first source/drain via, and the second source/drain via to generate a modified integrated circuit layout for the standard cell having the cell height. Tuning the dimensions is based on a desired performance optimization of the standard cell and includes correlating a power line dimension with a signal line dimension, the power line dimension with a first source/drain via dimension, and the signal line dimension with a second source/drain via dimension, such that a change in the power line dimension corresponds with a change in the signal line dimension, the first source/drain via dimension, and the second source/drain via dimension. The method further includes fabricating the standard cell based on the modified integrated circuit layout.

In some embodiments, the desired performance optimization is power performance optimization, the power line dimension is a power line width, and the signal line dimension is a signal line width. The power line width, the signal line width, the first source/drain via dimension, and the second source/drain via dimension are along the same direction, and tuning the dimensions includes increasing the power line width and the first source/drain via dimension and decreasing the signal line width and the second source/drain via dimension.

In some embodiments, the desired performance optimization is signal performance optimization, the power line dimension is a power line width, and the signal line dimension is a signal line width. The power line width, the signal line width, the first source/drain via dimension, and the second source/drain via dimension are along the same direction, and tuning the dimensions includes increasing the signal line width and the second source/drain via dimension and decreasing the power line width and the first source/drain via dimension.

In some embodiments, the integrated circuit layout further includes a via and a conductive line. The via connects the conductive line to the signal line. The method can further include tuning dimensions of the via and the conductive line to generate the modified integrated circuit layout for the standard cell having the cell height. Tuning of the dimension can include correlating a via dimension with the signal line dimension and a conductive line dimension with the signal line dimension, such that a change in the via dimension and the conductive line dimension corresponds with the change in the signal line dimension.

In some embodiments, the power line dimension is a power line width, the signal line dimension is a signal line width, and the conductive line dimension is a conductive line width. The power line width, the signal line width, the first source/drain via dimension, the second source/drain via dimension, and the via dimension are along a first direction and the conductive line width is along a second direction. Tuning the dimensions can include, when the desired performance optimization is power performance optimization, increasing the power line width and the first source/drain via dimension and decreasing the signal line width, the second source/drain via dimension, the via dimension, and the conductive line width. Tuning the dimensions can include, when the desired performance optimization is signal performance optimization, decreasing the power line width and the first source/drain via dimension and increasing the signal line width, the second source/drain via dimension, the via dimension, and the conductive line width.

In some embodiments, the conductive line further has a conductive line length along the first direction and tuning the dimensions further includes, when the desired performance optimization is signal performance optimization, decreasing the conductive line length. In some embodiments, the via dimension is a first via dimension, the via further has a second via dimension along the second direction, and tuning the dimensions further includes, when the desired performance optimization is signal performance optimization, increasing the second via dimension. In some embodiments, the integrated circuit layout further includes a gate line and the power line dimension and the signal line dimension are along a lengthwise direction of the gate line. In some embodiments, a percentage of change in the power line dimension is the same as a percentage of change in the signal line dimension.

Another exemplary method includes receiving an interconnect layout for a standard cell. The interconnect layout includes a metallization layer and a via layer. The metallization layer includes a first conductive line and a second conductive line, the via layer includes a first via and a second via, the first via is connected to the first conductive line and a source of a transistor, and the second via is connected to the second conductive line and a drain of the transistor. The method further includes modifying the interconnect layout for the standard cell. The modifying can include, if performance of the standard cell is sensitive to a first type of performance characteristic, enlarging the first conductive line and the first via and shrinking the second conductive line and the second via. The modifying can include, if performance of the standard cell is sensitive to a second type of performance characteristic that is different than the first type of performance characteristic, shrinking the first conductive line and the first via and enlarging the second conductive line and the second via.

The method further includes fabricating an interconnect of the standard cell using the modified interconnect layout of the standard cell. In some embodiments, an amount of the enlarging is the same as an amount of the shrinking. In some embodiments, the amount of the enlarging and the amount of the shrinking is ≤20%. In some embodiments, the standard cell has a cell dimension and the modifying the interconnect layout for the standard cell does not modify the cell dimension. In some embodiments, the transistor includes a gate that extends lengthwise along a first direction and the first conductive line and the second conductive line extend lengthwise along a second direction that is different than the first direction.

In some embodiments, the metallization layer is a first metallization layer and the via layer is a first via layer, and the first metallization layer further includes a third conductive line. The first conductive line, the second conductive line, and the third conductive line of the first metallization layer extend lengthwise along a first direction. The interconnect layout further includes a second metallization layer and a second via layer. The second metallization layer includes a fourth conductive line that extends lengthwise along a second direction that is different than the first direction, and the second via layer includes a third via that connects the fourth conductive line of the second metallization layer to the third conductive line of the first metallization layer. In some embodiments, modifying the interconnect layout for the standard cell further includes, if performance of the standard cell is sensitive to the first type of performance characteristic, shrinking the third via and the fourth conductive line and enlarging the third conductive line. In some embodiments, modifying the interconnect layout for the standard cell further includes, if performance of the standard cell is sensitive to the second type of performance characteristic, enlarging the third via and shrinking the third conductive line.

In some embodiments, modifying the interconnect layout for the standard cell further includes, if performance of the standard cell is sensitive to the second type of performance characteristic, enlarging the fourth conductive line. In some embodiments, enlarging the fourth conductive line includes enlarging the fourth conductive line along the first direction. In some embodiments, modifying the interconnect layout for the standard cell further includes, if performance of the standard cell is sensitive to the second type of performance characteristic, shrinking the fourth conductive line along the second direction.

An exemplary integrated circuit system includes a processor and a communication module communicatively coupled to the processor and configured to receive a device layout for a standard cell. The device layout for the standard cell includes a transistor and a multilayer interconnect. The multilayer interconnect includes a power line, signal lines, a source contact connected to the power line and a source of the transistor, and a drain contact connected to one of the signal lines and a drain of the transistor. The integrated circuit (IC) system further includes a non-transitory, computer-readable storage communicatively coupled to the processor and including instructions executable by the processor. The instructions include instructions for modifying the device layout for the standard cell. The modifying includes, if performance of the standard cell is sensitive to power-related features, enlarging the power line and the source contact and shrinking the signal lines and the drain contact, and if performance of the standard cell is sensitive to signal-related features, shrinking the power line and the source contact and enlarging the signal lines and the drain contact. In some embodiments, the instructions further include tuning an amount of the enlarging that to be the same as an amount of the shrinking.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
receiving an integrated circuit layout for a standard cell having a cell height, wherein the integrated circuit layout includes a power line, a signal line, a first source/drain via connected to the power line, and a second source/drain via connected to the signal line;
tuning dimensions of the power line, the signal line, the first source/drain via, and the second source/drain via to generate a modified integrated circuit layout for the standard cell having the cell height, wherein:
the tuning of the dimensions is based on a desired performance optimization of the standard cell, and
the tuning of the dimensions includes correlating a power line dimension with a signal line dimension, the power line dimension with a first source/drain via dimension, and the signal line dimension with a second source/drain via dimension, such that a change in the power line dimension corresponds with a change in the signal line dimension, the first source/drain via dimension, and the second source/drain via dimension; and
fabricating the standard cell based on the modified integrated circuit layout.

2. The method of claim 1, wherein:
the desired performance optimization is power performance optimization, the power line dimension is a power line width, and the signal line dimension is a signal line width;
the power line width, the signal line width, the first source/drain via dimension, and the second source/drain via dimension are along the same direction; and
the tuning of the dimensions includes:
increasing the power line width and the first source/drain via dimension and decreasing the signal line width and the second source/drain via dimension.

3. The method of claim 1, wherein:
the desired performance optimization is signal performance optimization, the power line dimension is a power line width, and the signal line dimension is a signal line width;
the power line width, the signal line width, the first source/drain via dimension, and the second source/drain via dimension are along the same direction; and
the tuning of the dimensions includes:
increasing the signal line width and the second source/drain via dimension and decreasing the power line width and the first source/drain via dimension.

4. The method of claim 1, wherein the integrated circuit layout further includes a via and a conductive line, wherein the via connects the conductive line to the signal line, and the method further comprises:
tuning dimensions of the via and the conductive line to generate the modified integrated circuit layout for the standard cell having the cell height, wherein:
the tuning of the dimensions includes correlating a via dimension with the signal line dimension and a conductive line dimension with the signal line dimension, such that a change in the via dimension and the conductive line dimension corresponds with the change in the signal line dimension.

5. The method of claim 4, wherein:
the power line dimension is a power line width, the signal line dimension is a signal line width, and the conductive line dimension is a conductive line width;
the power line width, the signal line width, the first source/drain via dimension, the second source/drain via dimension, and the via dimension are along a first direction and the conductive line width is along a second direction; and
the tuning of the dimensions includes:
when the desired performance optimization is power performance optimization, increasing the power line width and the first source/drain via dimension and decreasing the signal line width, the second source/drain via dimension, the via dimension, and the conductive line width, and
when the desired performance optimization is signal performance optimization, decreasing the power line width and the first source/drain via dimension and increasing the signal line width, the second source/drain via dimension, the via dimension, and the conductive line width.

6. The method of claim 5, wherein:
the conductive line further has a conductive line length along the first direction; and
the tuning of the dimensions further includes, when the desired performance optimization is signal performance optimization, decreasing the conductive line length.

7. The method of claim 5, wherein:
the via dimension is a first via dimension and the via further has a second via dimension along the second direction; and
the tuning of the dimensions further includes, when the desired performance optimization is signal performance optimization, increasing the second via dimension.

8. The method of claim 1, wherein the integrated circuit layout further includes a gate line and the power line dimension and the signal line dimension are along a lengthwise direction of the gate line.

9. The method of claim 1, wherein a percentage of change in the power line dimension is the same as a percentage of change in the signal line dimension.

10. A method comprising:
receiving an interconnect layout for a standard cell, wherein the interconnect layout includes a metallization layer and a via layer, wherein the metallization layer includes a power line and a signal line, the via layer includes a first source/drain via and a second source/drain via, the first source/drain via is connected to the power line and a source of a transistor, and the second source/drain via is connected to the signal line and a drain of the transistor;
modifying the interconnect layout for the standard cell, wherein the modifying includes:
if performance of the standard cell is sensitive to power-related features, enlarging the power line and the first source/drain via and shrinking the signal line and the second source/drain via, and
if performance of the standard cell is sensitive to signal-related features, shrinking the power line and the first source/drain via and enlarging the signal line and the second source/drain via; and
fabricating an interconnect of the standard cell using the modified interconnect layout of the standard cell.

11. The method of claim 10, wherein an amount of the enlarging is the same as an amount of the shrinking.

12. The method of claim 10, wherein an amount of the enlarging and an amount of the shrinking is ≤20%.

13. The method of claim 10, wherein:
the metallization layer is a first metallization layer, the via layer is a first via layer, and the signal line is a first signal line;
the first metallization layer further includes a second signal line, wherein the power line, the first signal line, and the second signal line of the first metallization layer extend lengthwise along a first direction;
the interconnect layout further includes a second metallization layer and a second via layer, wherein the second metallization layer includes a conductive line that extends lengthwise along a second direction that is different than the first direction, and the second via layer includes a conductive via that connects the conductive line of the second metallization layer to the second signal line of the first metallization layer; and
the modifying the interconnect layout for the standard cell further includes:
if performance of the standard cell is sensitive to the power-related features, shrinking the conductive via, the conductive line, and the second signal line, and
if performance of the standard cell is sensitive to the signal-related features, enlarging the conductive via and the second signal line.

14. The method of claim 13, wherein the modifying the interconnect layout for the standard cell further includes, if performance of the standard cell is sensitive to the signal-related features, enlarging the conductive line.

15. The method of claim 14, wherein the enlarging the conductive line includes enlarging the conductive line along the first direction.

16. The method of claim 15, wherein the modifying the interconnect layout for the standard cell further includes, if performance of the standard cell is sensitive to the signal-related features, shrinking the conductive line along the second direction.

17. The method of claim 10, wherein:
the standard cell has a cell dimension; and
the cell dimension is not modified when modifying the interconnect layout.

18. The method of claim 10, wherein:
the transistor includes a gate that extends lengthwise along a first direction; and
the power line and the signal line extend lengthwise along a second direction that is different than the first direction.

19. A method comprising:
receiving an interconnect layout for a standard cell, wherein the interconnect layout includes a group of power lines having a first width, a group of signal lines having a second width, a group of power vias having a third width, and a group of signal vias having a fourth width, wherein the group of power lines and the group of signal lines is connected to a device layer by the group of power vias and the group of signal vias, respectively;
modifying the interconnect layout for the standard cell, wherein the modifying includes:
if performance of the standard cell is sensitive to power-related features, increasing the first width and the third width and decreasing the second width and the fourth width, and
if performance of the standard cell is sensitive to signal-related features, decreasing the first width and the third width and increasing the second width and the fourth width; and
fabricating an interconnect of the standard cell using the modified interconnect layout of the standard cell.

20. The method of claim 19, further comprising tuning an amount of the increasing to be the same as an amount of the decreasing.

* * * * *